United States Patent
Fudaba et al.

(10) Patent No.: US 9,730,126 B2
(45) Date of Patent: Aug. 8, 2017

(54) BASE STATION AND HANDOVER CONTROL METHOD

(71) Applicant: FUJITSU LIMITED, Kawasaki-shi, Kanagawa (JP)

(72) Inventors: Nobukazu Fudaba, Yokohama (JP); Dai Kimura, Yokohama (JP); Michiko Anbe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/295,073

(22) Filed: Jun. 3, 2014

(65) Prior Publication Data
US 2014/0364125 A1 Dec. 11, 2014

(30) Foreign Application Priority Data
Jun. 5, 2013 (JP) .................. 2013-119283

(51) Int. Cl.
*H04W 72/00* (2009.01)
*H04W 36/00* (2009.01)
*H04W 36/22* (2009.01)
*H04W 84/04* (2009.01)

(52) U.S. Cl.
CPC .......... *H04W 36/22* (2013.01); *H04W 84/045* (2013.01)

(58) Field of Classification Search
CPC ... H04W 88/08–88/188; H04W 28/08; H04W 28/085
USPC ............. 455/432.1–444, 560, 561, 572, 574, 455/343.1–343.6; 370/310.2, 328, 370/331–333, 338
See application file for complete search history.

(56) References Cited

U.S. PATENT DOCUMENTS

| | | | | |
|---|---|---|---|---|
| 7,190,958 B1* | 3/2007 | Yarkosky | .............. | H04W 16/06 455/436 |
| 7,218,945 B2* | 5/2007 | Ogami | ................ | H04W 52/343 370/318 |
| 2009/0310568 A1* | 12/2009 | Chen | ...................... | H04W 36/04 370/332 |
| 2010/0075682 A1* | 3/2010 | del Rio-Romero | ... | H04W 16/08 455/439 |
| 2011/0124332 A1* | 5/2011 | Zhang | ................... | H04W 36/22 455/434 |
| 2011/0211560 A1 | 9/2011 | Yamamoto et al. | | |

(Continued)

FOREIGN PATENT DOCUMENTS

JP 2010-283440 A 12/2010
JP 2011-182009 A 9/2011

*Primary Examiner* — San Htun
(74) *Attorney, Agent, or Firm* — Arent Fox LLP

(57) ABSTRACT

A base station serving terminals, the base station including: a memory, and a processor coupled to the memory and configured to: select a terminal among the served terminals based on reception powers or reception qualities at the served terminals, when a number of the served terminals exceeds a threshold, determine an amount of change in transmission parameter so that a reception quality at the selected terminal from another base station satisfies a certain condition in case where a handover of the selected terminal to the other base station is performed, the other base station being selected based on the reception powers or the reception qualities, perform the handover of the selected terminal to the other base station, and change the transmission parameter by the determined amount of change.

14 Claims, 23 Drawing Sheets

(56) References Cited

U.S. PATENT DOCUMENTS

2012/0270553 A1* 10/2012 Ha .................. H04W 36/22
455/438

* cited by examiner

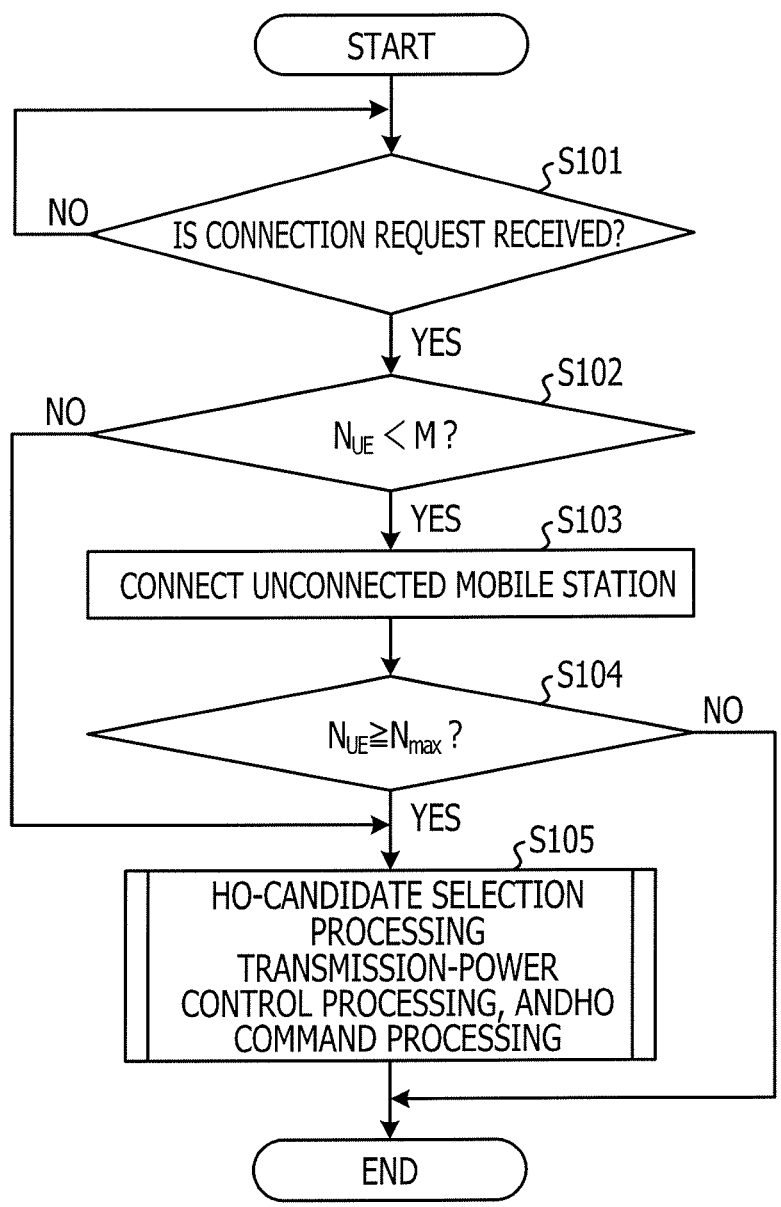

BASE STATION AND HANDOVER CONTROL METHOD

CROSS-REFERENCE TO RELATED APPLICATION

This application is based upon and claims the benefit of priority of the prior Japanese Patent Application No. 2013-119283 filed on Jun. 5, 2013, the entire contents of which are incorporated herein by reference.

FIELD

The embodiments discussed herein are related to a base station and a handover control method.

BACKGROUND

In recent years, base stations called femto base stations have been known. Examples of femto base stations include base stations that form femto cells covering smaller ranges than those of the macrocells of macro base stations and those of the picocells of pico base stations. Femto base stations are used, for example, to provide services for users in environments where it is difficult for radio waves to reach, such as in basements or buildings.

When femto base stations are used, they are in some cases installed at indoor spots in shopping malls and stations where a large number of general users are present. In such cases, a large number of mobile stations (may be referred to as user equipment(s) (UE(s)) or terminal(s)) may concentrate temporarily in the femto cell of a certain femto base station, thereby sharply increasing the load on that femto base station.

However, from the viewpoint of apparatus size and communication load, the number of mobile stations that are connectable to the femto cell of each femto base station (namely, the number of mobile stations that can be served or managed by the femto cell of each femto base station) is smaller than that of macro base stations and pico base stations. Consequently, when a large number of mobile stations concentrate temporarily in the femto cell of a certain femto base station, it is difficult for each mobile station to connect to the femto base station.

To address this difficulty, there is a known connection system that connects the mobile stations to the femto cell in the order that connection requests (may be referred to as attach request(s)) from the mobile stations (that have not been served or managed by the femto cell) arrive at the femto base station. In the connection system, the femto base station monitors the number of mobile stations that are currently connected to the femto cell thereof and rejects a connection request from a new mobile station when the number of connected mobile stations reaches a pre-defined threshold. This arrangement guarantees communication of mobile stations that are currently connected to a certain base station, when a large number of mobile stations concentrate in the cell of the base station.

Related art is disclosed in Japanese Laid-open Patent Publication No. 2011-182009 and Japanese Laid-open Patent Publication No. 2010-283440.

SUMMARY

According to an aspect of the invention, a base station serving terminals, the base station includes a memory, and a processor coupled to the memory and configured to: select a terminal among the served terminals based on reception powers or reception qualities at the served terminals, when a number of the served terminals exceeds a threshold, determine an amount of change in transmission parameter so that a reception quality at the selected terminal from another base station satisfies a certain condition in case where a handover of the selected terminal to the other base station is performed, the other base station being selected based on the reception powers or the reception qualities, perform the handover of the selected terminal to the other base station, and change the transmission parameter by the determined amount of change.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a procedure of HO control processing performed by the femto base station according to the first embodiment;

DESCRIPTION OF EMBODIMENTS

However, in the known connection system in which mobile stations are connected to the femto cell of a femto base station in the order that connection requests from the mobile stations arrive at the femto base station, no consideration has been given to appropriately switching the connection destinations of the mobile stations to another cell when a large number of mobile stations concentrate in the cell of a certain base station.

That is, in the known connection system, when the number of mobile stations (hereinafter referred to as "existing mobile stations") that are currently connected to the femto cell of the femto base station reaches a threshold, a connection request from a new mobile station is rejected. Thus, the new mobile station is not connected to the femto cell.

Figure 22:
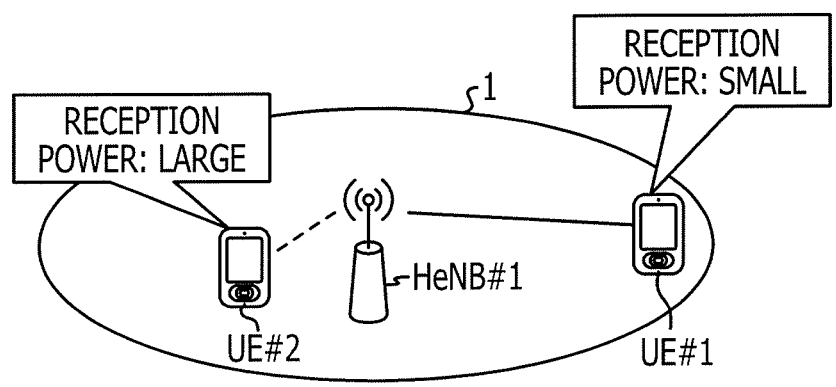
FIG. 22 is a diagram illustrating a problem in related art.
Figure 23:
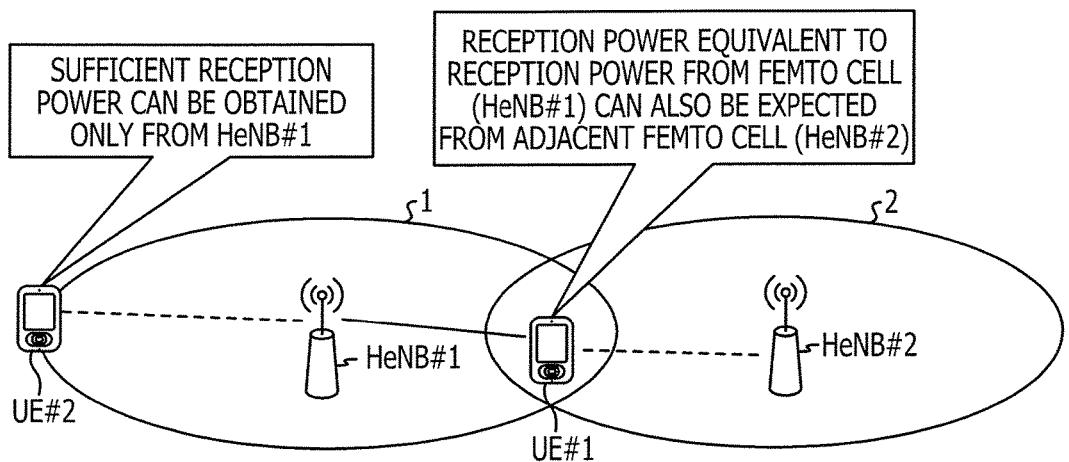
FIG. 23 is a diagram illustrating a problem in the related art.

Such a problem in the related art will now be described with reference to FIGS. 22 and 23. FIGS. 22 and 23 are diagrams illustrating problems in the related art. For example, assume a situation in which, as illustrated in FIG. 22, an existing mobile station UE#1 is currently connected to a femto cell 1 of a femto base station HeNB#1, a mobile station UE#2 has not been connected to the femto cell 1, and a threshold for the number of mobile stations that are connectable to the femto cell 1 is "1". In the example illustrated in FIG. 22, it is also assumed that reception power for signals transmitted from the femto cell 1 to the new mobile station UE#2 is larger than reception power for signals transmitted from the femto cell 1 to the existing mobile station UE#1. In this case, since the number of mobile stations that are currently connected to the femto cell 1 has reached the threshold "1", the femto base station HeNB#1 rejects a connection request from the new mobile station UE#2 whose reception power is larger than that of the existing mobile station UE#1. Consequently, the new mobile station UE#2 is not connected to the femto cell 1.

Also, for example, assume a situation in which, as illustrated in FIG. 23, the existing mobile station UE#1 is currently connected to the femto cell 1 of the femto base station HeNB#1, the mobile station UE#2 has not been connected to the femto cell 1, and the threshold for the number of mobile stations that are connectable to the femto cell 1 is "1". In the example in FIG. 23, it is also assumed that the existing mobile station UE#1 is located at a cell border between the femto cell 1 and another femto cell 2 of a femto base station HeNB#2 that is adjacent to the femto base station HeNB#1. In this case, some of the signals transmitted from the other femto cell 2 of the femto base station HeNB#2 arrive at the existing mobile station UE#1. It is therefore expected that the existing mobile station UE#1 can also obtain, from the femto cell 2, reception power that is equivalent to the reception power from the femto cell 1. However, the number of mobile stations that are currently connected to the femto cell 1 has already reached the threshold "1". Thus, the femto base station HeNB#1 rejects a connection request from the new mobile station UE#2 whose reception power for signals transmitted from the femto cell 1 is expected to be sufficiently large. Consequently, the new mobile station UE#2 is not connected to the femto cell 1.

In addition, in the example in FIG. 23, there may also be a situation in which the mobile station UE#2 that is not connected to the femto cell 1 is connected to the other femto cell 2. However, in this situation, there is a possibility that the femto cell 1 gives interference to the mobile station UE#2 in downlink or the femto cell 1 receives interference from the mobile station UE#2 in uplink.

In the situations illustrated in FIGS. 22 and 23, a scheme can be conceived from the viewpoint of load balancing that is to autonomously perform processing for switching the connection destination of the existing mobile station from the femto cell to the other cell. Processing for switching the connection destination of an existing mobile station to another cell is called a handover (HO) process. However, when the HO process is merely autonomously performed, there is a possibility that interference between signals transmitted from an HO-source femto cell and signals transmitted from another HO-destination cell increases.

The technology disclosed herein has been conceived in view of the foregoing, and an object of the technology is to provide a base station and a handover control method that autonomously perform an HO process when a large number of mobile stations concentrate in the cell of a particular base station and that are capable of reducing signal interference due to a forcibly executed HO process caused by control of the number of connections.

Embodiments of a base station and a handover control method disclosed herein will be described below in detail with reference to the accompanying drawings. The embodiments are not intended to limit the technology disclosed herein. In the following embodiments, a description will be given of a case in which an example of a base station is a femto base station that forms a femto cell covering a smaller range than that of the macrocell of a macro base station and that of the picocell of a pico base station. The technology disclosed herein, however, is not limited to this example, and the following embodiments are also applicable to macro base stations and pico base stations.

First Embodiment

Figure 1:
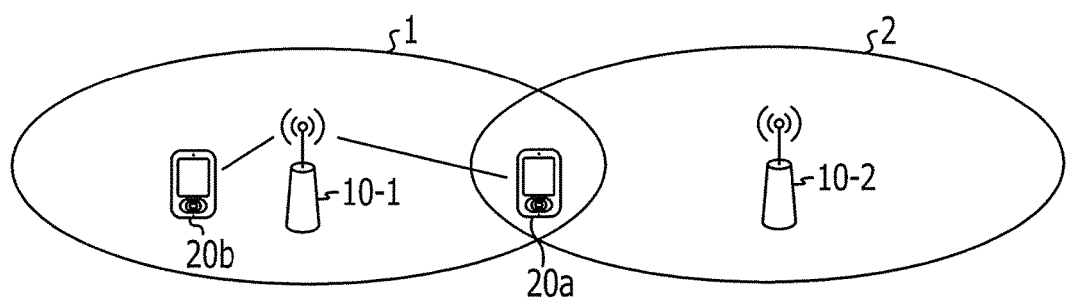
FIG. 1 is a diagram illustrating the overall configuration of a wireless communication system including a femto base station according to a first embodiment.

FIG. 1 is a diagram illustrating the overall configuration of a wireless communication system including a femto base station according to a first embodiment. The wireless communication system illustrated in FIG. 1 includes mobile stations 20a and 20b, a femto base station 10-1, and another base station 10-2.

As illustrated in FIG. 1, the mobile stations 20a and 20b are currently connected to a femto cell 1 of the femto base station 10-1. Of the mobile stations 20a and 20b, the mobile station 20a is located at a cell border between the femto cell 1 and a cell 2 (hereinafter referred to as an "adjacent cell 2", as appropriate) of the other base station 10-2 that is adjacent to the femto base station 10-1. Consequently, some of the signals transmitted from the adjacent cell 2 arrive at the mobile station 20a as interference signals.

In this case, the number of mobile stations that are connectable to the femto cell 1 is limited by a predetermined threshold. In the example illustrated in FIG. 1, a threshold indicating the number of mobile stations that are connectable to the femto cell 1 is assumed to be "1". Thus, in the present embodiment, a process for switching any of the connection destinations of the mobile stations 20a and 20b from the femto cell 1 to the adjacent cell 2 (this process is hereinafter referred to as a "handover (HO) process") is autonomously performed in order to reduce the number of mobile stations that are currently connected to the femto cell 1. Autonomously performing an HO process means, for example, performing an HO process under a situation in which a femto base station does not have a special interface (such as an X2 interface) for performing direct exchange with an adjacent femto base station and also is not under the control of a controller that centrally controls a plurality of femto base stations. Now, a description will be given of an example of a procedure of an HO control method for autonomously performing an HO process.

For example, the femto base station 10-1 monitors the number of connected mobile stations, which are mobile stations currently connected to the femto cell 1 of the femto base station 10-1. In the example illustrated in FIG. 1, since two mobile stations, namely, the mobile stations 20a and 20b, are currently connected to the femto cell 1, the femto base station 10-1 detects that the number of connected mobile stations is "2".

When the number of connected mobile stations exceeds the threshold indicating the number of mobile stations that are connectable to the femto cell 1, the femto base station 10-1 selects, from the connected mobile stations, an HO candidate that is made to execute an HO process for switching the connection destination from the femto cell 1 to the adjacent cell 2. In the example illustrated in FIG. 1, since the number of connected mobile stations, "2", exceeds the threshold "1", the femto base station 10-1 selects an HO candidate from the mobile stations 20a and 20b, which are connected mobile stations. In this case, it is assumed that the mobile station 20a located at the cell border between the femto cell 1 and the adjacent cell 2 is selected, as an HO candidate, from the mobile stations 20a and 20b, which are connected mobile stations. The reason why the mobile station 20a is selected as the HO candidate is that the mobile station 20a can receive signals, transmitted from the adjacent cell 2, at a sufficient level.

The femto base station 10-1 controls (namely changes or adjusts) a parameter related to transmission signals transmitted from the femto cell 1 so that, of the transmission signals, signals that arrive at a mobile station selected as an HO candidate decrease. In the example illustrated in FIG. 1, the mobile station 20a located at the cell border between the femto cell 1 and the adjacent cell 2 is selected as the HO candidate. Thus, the femto base station 10-1 controls the parameter related to transmission signals transmitted from the femto cell 1 so that, of the transmission signals, signals that arrive at the mobile station 20a, which is an HO candidate, decrease. In the present embodiment, the parameter related to transmission signals is assumed to be transmission power used for transmitting the transmission signals. The femto base station 10-1 performs, for example, control for reducing the transmission power so that, of the transmission signals transmitted from the femto cell 1, signals that arrive at the mobile station 20a, which is the HO candidate, decrease. The parameter related to transmission signals may also be, in addition to the transmission power, a parameter for changing a beam pattern or directivity of transmission signals radiated from an antenna. Examples of the beam pattern include the orientation (tilt) and a gain of the antenna that radiates the transmission signals into space. The parameter related to transmission signals may correspond to a transmission parameter for changing a cell coverage of the femto base station 10-1.

The femto base station 10-1 instructs the mobile station selected as the HO candidate to execute an HO process. In the example illustrated in FIG. 1, the mobile station 20a located at the cell border between the femto cell 1 and the adjacent cell 2 has been selected as the HO candidate. Thus, the femto base station 10-1 instructs the mobile station 20a to execute an HO process. As a result, the mobile station 20a executes the HO process to switch the connection destination from the femto cell 1 to the adjacent cell 2. Thus, the number of mobile stations that are currently corrected to the femto cell 1 is changed from "2" to "1".

As described above, when a large number of mobile stations concentrate in the femto cell 1 of the femto base station 10-1 in the present embodiment, the femto base station 10-1 selects an HO candidate from the large number of mobile stations and controls the parameter related to transmission signals so that, of the transmission signals, signals that arrive at the HO candidate decrease. Thus, the connection destination of the mobile station selected as the HO candidate can be appropriately switched to the adjacent cell 2, which is an HO destination, and it is also possible to reduce signal interference between the femto cell 1, which is an HO source, and the adjacent cell 2, which is an HO destination. Consequently, at the mobile station that has perform HO, a reception quality from the adjacent cell (HO destination) satisfies a certain condition. As a result, according to the present embodiment, when a large number of mobile stations concentrate in the femto cell 1 of the femto base station 10-1, the femto base station 10-1 autonomously performs an HO process, thereby making it possible to reduce signal interference due to the HO process.

Figure 2:
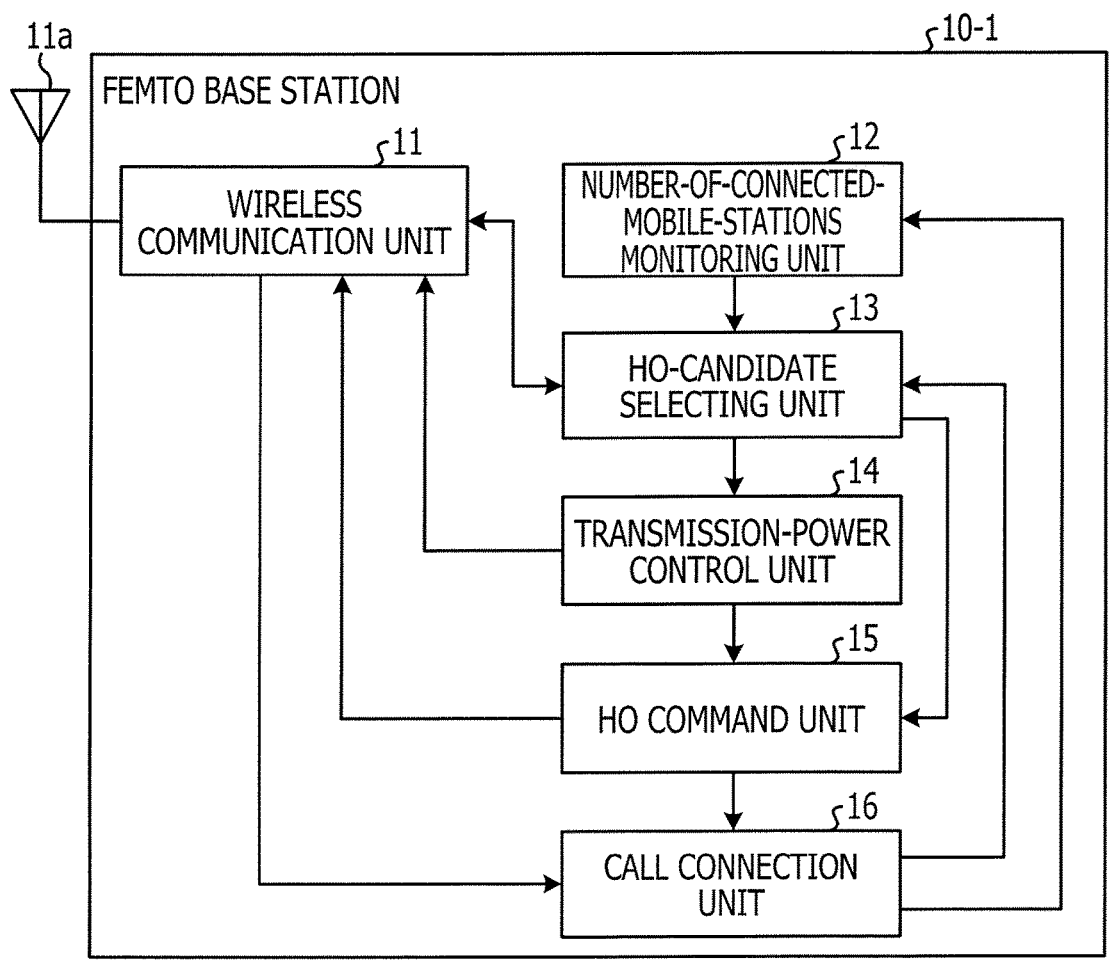
FIG. 2 is a block diagram illustrating the configuration of the femto base station according to the first embodiment.

Next, the configuration of the femto base station 10-1 illustrated in FIG. 1 will be described with reference to FIG. 2. FIG. 2 is a block diagram illustrating the configuration of the femto base station 10-1 according to the first embodiment. As illustrated in FIG. 2, the femto base station 10-1 has a wireless communication unit 11, a number-of-connected-mobile-stations monitoring unit 12, an HO-candidate selecting unit 13, a transmission-power control unit 14, an HO command unit 15, and a call connection unit 16. The wireless communication unit 11 is implemented by, for example, an analog circuit, such as a radio frequency (RF) circuit. The number-of-connected-mobile-stations monitoring unit 12, the HO-candidate selecting unit 13, the transmission-power control unit 14, the HO command unit 15, and the call connection unit 16 are implemented by, for example, a central processing unit (CPU) or a digital signal processor (DSP).

The wireless communication unit 11 transmits/receives, via an antenna 11a, various signals and various types of data transmitted from mobile stations located in the femto cell 1. Signals radiated from the wireless communication unit 11 into space via the antenna 11a serve as the transmission signals transmitted from the femto cell 1.

For example, upon receiving, via the antenna 11a, radio signals transmitted from a connected mobile station, which is a mobile station currently connected to the femto cell 1, the wireless communication unit 11 outputs the received radio signals to the call connection unit 16.

Also, for example, upon receiving, via the antenna 11a, a connection request transmitted from an unconnected mobile station, which is a mobile station located in the femto cell 1 but is not connected to the femto cell 1, the wireless communication unit 11 outputs the received connection request to the call connection unit 16.

Also, for example, for each connected mobile station, the wireless communication unit 11 receives, via the antenna 11a, measurement values including, for example, reception power and a reception quality for transmission signals transmitted from the femto cell 1 and outputs the measurement values, received for each connected mobile station, to the HO-candidate selecting unit 13. The reception power for transmission signals transmitted from the femto cell 1 refers to reception power when a connected mobile station receives transmission signals transmitted from the femto cell 1. The reception quality for transmission signals transmitted from the femto cell 1 refers to a reception quality when a connected mobile station receives transmission signals transmitted from the femto cell 1.

In addition, for example, the wireless communication unit 11 receives, from the HO command unit 15, a command signal for instructing a mobile station selected as an HO candidate to execute an HO process and transmits, via the antenna 11a, the received command signal to the mobile station selected as the HO candidate.

The number-of-connected-mobile-stations monitoring unit 12 receives, from the call connection unit 16, an input indicating the number of connected mobile stations, $N_{UE}$, which is a detection result. The number-of-connected-mobile-stations monitoring unit 12 uses the detection result to monitor the number of connected mobile stations, $N_{UE}$. The number-of-connected-mobile-stations monitoring unit 12 outputs the number of connected mobile stations, $N_{UE}$, to the HO-candidate selecting unit 13 as a monitoring result.

The HO-candidate selecting unit 13 receives the monitoring result input from the number-of-connected-mobile-stations monitoring unit 12. The HO-candidate selecting unit 13 receives, from the call connection unit 16, a notification indicating the timing at which an unconnected mobile station was connected to the femto cell 1. After the call connection unit 16 connects the unconnected mobile station to the femto cell 1, the HO-candidate selecting unit 13 determines whether or not the number of connected mobile stations, $N_{UE}$, exceeds a threshold $N_{max}$ indicating the number of mobile stations that are connectable to the femto cell 1, based on the monitoring result. It is assumed that the threshold $N_{max}$ in the present embodiment has been set to a value that is an upper limit of the number of mobile stations that are connectable to the femto cell 1 and that is smaller than a maximum number of connections, M, indicating an upper limit pre-specified as an apparatus specification of the femto base station 10-1. When the number of connected mobile stations, $N_{UE}$, exceeds the threshold $N_{max}$, the HO-candidate selecting unit 13 selects an HO candidate from the connected mobile stations.

Now, a description will be given of details of the HO-candidate selection processing performed by the HO-candidate selecting unit 13. When the number of connected mobile stations, $N_{UE}$, exceeds the threshold $N_{max}$, the HO-candidate selecting unit 13 transmits, to each of the connected mobile stations via the wireless communication unit 11, a measurement command indicating that measure measurement values including reception power, a reception quality, and so on are to be measured and to be transmitted to the femto base station 10-1. The HO-candidate selecting unit 13 obtains, via the wireless communication unit 11, the measurement values that the connected mobile stations have reported in response to the measurement command. The measurement values reported from each of the connected mobile stations include, for example, reception power for transmission signals transmitted from the femto cell 1 and the femto cell 2 and a reception quality for transmission signals transmitted from the femto cell 1. The HO-candidate selecting unit 13 selects, as an HO candidate, a mobile station that is included in the connected mobile stations and whose reception power or reception quality for the transmission signals transmitted from the femto cell 1 is the lowest (namely the worst). In the present embodiment, the HO-candidate selecting unit 13 selects, as an HO candidate, a mobile station whose reception power for the transmission signals transmitted from the femto cell 1 is the lowest. Upon completing the HO candidate selection, the HO-candidate selecting unit 13 outputs a selection completion notification and information of the HO candidate to the transmission-power control unit 14 and the HO command unit 15.

The transmission-power control unit 14 receives the selection completion notification and the HO-candidate information from the HO-candidate selecting unit 13. Upon being triggered by the selection completion notification, the transmission-power control unit 14 performs control for reducing the transmission power used for transmitting transmission signals transmitted from the femto cell 1 (hereinafter referred to as "transmission power", as appropriate) so that, of the transmission signals, signals that arrive at the mobile station selected as the HO candidate decrease. For example, the transmission-power control unit 14 performs control for reducing the transmission power, by adjusting the gain of an amplifier built into the wireless communication unit 11 or by changing average amplitude of digital signal.

Now, a description will be given of details of the transmission-power control processing performed by the transmission-power control unit 14. The transmission-power control unit 14 estimates a reception quality for signals transmitted from the adjacent cell 2 to a mobile station selected as an HO candidate, when transmission signals transmitted from the femto cell 1 are assumed to be reduced in the transmission power by a power control amount Δ to be calculated. The reception quality for signals transmitted from the adjacent cell 2 to a mobile station selected as an HO candidate refers to a reception quality when a mobile station selected as an HO candidate is connected to the adjacent cell 2. In the present embodiment, a signal-to-interference-plus-noise power ratio (SINR) is used as an example of the reception quality. When transmission signals transmitted from the femto cell 1 are assumed to be reduced in the transmission power by the power control amount Δ to be calculated, an $SINR_{D\_TPC}$ for signals transmitted from the adjacent cell 2 to the mobile station selected as the HO candidate is estimated using equation (1) below.

$$SINR_{D\_TPC} = P_D - 10 * \log 10 \left\{ 10^{\frac{P_S - \Delta}{10}} + 10^{\frac{1}{10}} \right\} \quad (1)$$

where $P_S$ denotes reception power [dB] for transmission signals transmitted from an HO-source cell (the femto cell 1), $P_D$ denotes reception power [dB] for signals transmitted from an HO-destination cell (the adjacent cell 2), and I denotes interference power [dB], including noise power, from cells other than the adjacent cell.

Subsequently, the transmission-power control unit 14 calculates the power control amount Δ with which the estimated reception quality (the $SINR_{D\_TPC}$ in the present embodiment) is made to match a target value. When the target value of the $SINR_{D\_TPC}$ is indicated by $SINR_{target\_D}$, the power control amount Δ is calculated using equation (2) below.

$$SINR_{D\_TPC} = SINR_{target\_D} \quad (2)$$

$$\Leftrightarrow P_D - 10 * \log 10 \left\{ 10^{\frac{P_S - \Delta}{10}} + 10^{\frac{1}{10}} \right\} = SINR_{target\_D}$$

$$\Leftrightarrow \Delta = P_S - 10 * \log 10 \left\{ 10^{\frac{P_S - SINR_{target\_D}}{10}} - 10^{\frac{1}{10}} \right\}.$$

Subsequently, the transmission-power control unit 14 performs control for reducing the transmission power, based on the calculated power control amount Δ. For example, by adjusting the gain of the amplifier built into the wireless communication unit 11 or by changing average amplitude of digital signal, the transmission-power control unit 14 reduces the transmission power by the power control amount Δ.

Figure 3:
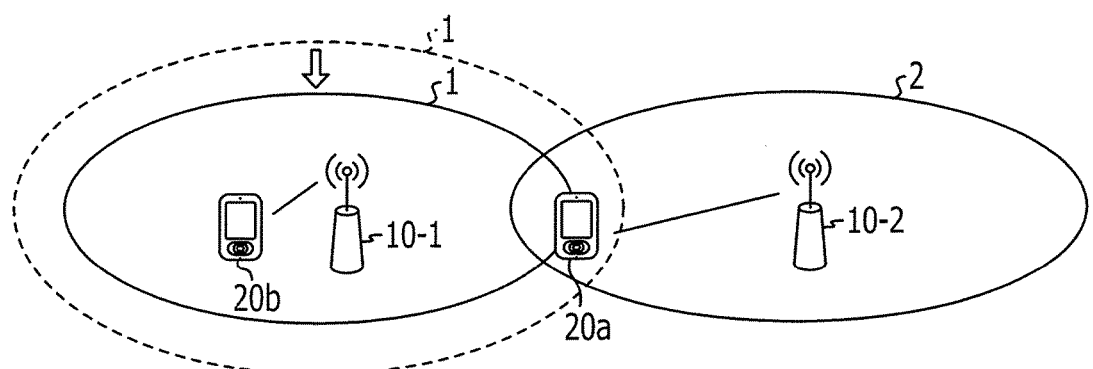
FIG. 3 is a diagram illustrating a change in the coverage of the femto cell 1 when transmission power is reduced.

FIG. 3 is a diagram illustrating a change in the coverage of the femto cell 1 when the transmission power is reduced. FIG. 3 illustrates an example of a state in which the mobile station 20a located at the cell border between the femto cell 1 and the adjacent cell 2 is selected as an HO candidate and the mobile station 20a switches the connection destination thereof from the femto cell 1 to the adjacent cell 2. When the transmission-power control unit 14 reduces the transmission power for transmission signals transmitted from the femto cell 1, the coverage of the femto cell 1 is reduced, as indicated by an arrow in FIG. 3. In other words, of the transmission signals transmitted from the femto cell 1, signals that arrive at the mobile station 20a selected as the HO candidate decrease.

When performing the control for reducing the transmission power, the transmission-power control unit 14 may also specify an upper limit Δmax of the power control amount Δ in order to maintain the communication quality of a mobile station that is not selected as the HO candidate, that is, a mobile station that stays in the femto cell 1. Now, a description will be given of a scheme for specifying the upper limit Δmax of the power control amount Δ. The transmission-power control unit 14 estimates a reception quality for transmission signals transmitted from the femto cell 1 to a mobile station that is not selected as the HO candidate, when transmission signals are assumed to be transmitted from the femto cell 1 by using the transmission power reduced by the power control amount Δ to be calculated. The transmission-power control unit 14 then specifies the upper limit Δmax of the power control amount Δ so that the estimated reception quality does not fall below a predetermined lower-limit value. In this case, the lower-limit value of the SINRs of the mobile stations that stay in the femto cell 1 is indicated by $SINR_{target\_S}$, and the SINR of a mobile station whose SINR is the lowest among the SINRs of the mobile stations that stay in the femto cell 1 is indicated by $SINR_{S\_min}$. In this case, the power control amount Δ and the upper limit Δmax of the power control amount Δ have a relationship given by equations (3) below.

$$\Delta_{max} = SINR_{S\_min} = SINR_{target\_S}$$

$$\Delta = \max\{\min\{\Delta, \Delta_{max}\}, 0\} \quad (3)$$

Figure 4:
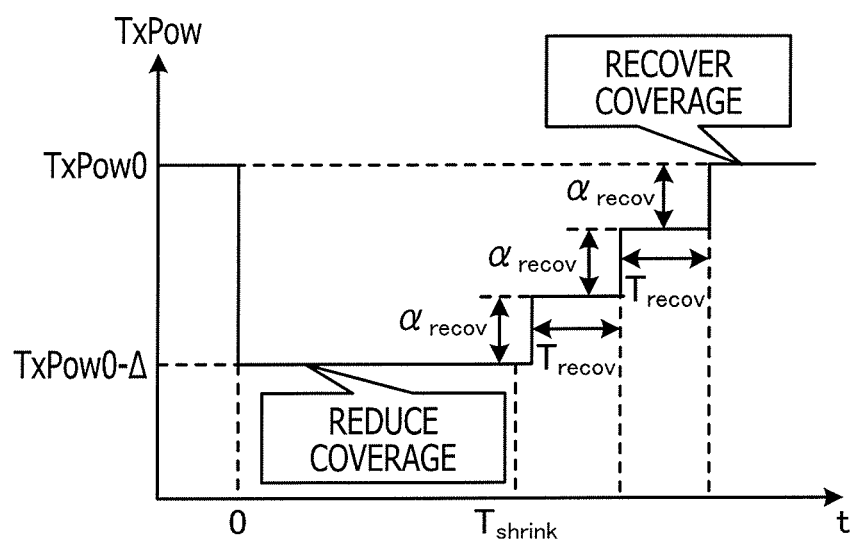
FIG. 4 is a schematic graph illustrating processing for recovering the transmission power.

When a predetermined time has passed after starting to execute the control for reducing the transmission power, the transmission-power control unit 14 recovers (or restore) the reduced transmission power to a value before executing the control. However, if the transmission power recovers instantaneously to the value before executing the control, the level of interference between the transmission signals transmitted from the femto cell 1 and the signals transmitted from the adjacent cell 2 increases sharply. Accordingly, the transmission-power control unit 14 in the present embodiment recovers, in a stepwise manner, the reduced transmission power to the initial value before executing the control. More specifically, when a predetermined time $T_{Shrink}$ has passed from time 0 at which the transmission power was reduced by the power control amount Δ, the transmission-power control unit 14 increases the transmission power in a stepwise manner in increments of $\alpha_{recov}$ at a period $T_{recov}$, with an initial value TxPow0 of the transmission power being the upper limit, as illustrated in FIG. 4. FIG. 4 is a schematic graph illustrating the processing for recovering the transmission power. In FIG. 4, the horizontal axis indicates time t, and the vertical axis indicates transmission power TxPow. The transmission power TxPow is represented by equation (4) below.

$$TxPow = \min\{TxPow + \alpha_{recov}, TxPow0\} \quad (4)$$

Now, a description will be given while referring back to FIG. 2. The HO command unit 15 receives the selection completion notification and the HO-candidate information from the HO-candidate selecting unit 13. The HO command unit 15 instructs the mobile station selected as the HO candidate to execute the HO process. More specifically, the HO command unit 15 transmits, to the base station 10-2 that forms the adjacent cell 2, an HO request for requesting that the mobile station selected as the HO candidate be connected to the adjacent cell 2. Thereafter, upon receiving an Ack response, which is an acknowledgement response for acknowledging the HO request, from the base station 10-2, the HO command unit 15 transmits, via the wireless communication unit 11, an command signal for instructing the mobile station selected as the HO candidate to execute an HO process.

When a connection request is received from an unconnected mobile station via the wireless communication unit 11, the call connection unit 16 connects the unconnected mobile station to the femto cell 1 so that the unconnected mobile station becomes a connected mobile station. The call connection unit 16 then notifies the HO-candidate selecting unit 13 of the timing at which the unconnected mobile station was connected to the femto cell 1 to become a connected mobile station.

Using radio signals input from the wireless communication unit 11, the call connection unit 16 detects the number of mobile stations connected to the femto cell 1, that is, the number of connected mobile stations, $N_{UE}$. The call connection unit 16 then outputs the number of connected mobile stations, $N_{UE}$, to the number-of-connected-mobile-stations monitoring unit 12 as a detection result.

Figure 5A:
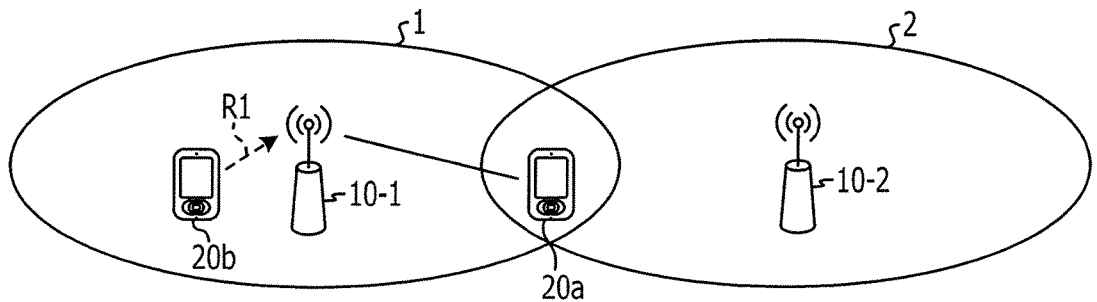
FIGS. 5A to 5C are diagrams illustrating a flow of processing in which the femto base station according to the first embodiment connects an unconnected mobile station to the femto cell and then makes a mobile station selected as an HO candidate to execute an HO process.
Figure 5B:
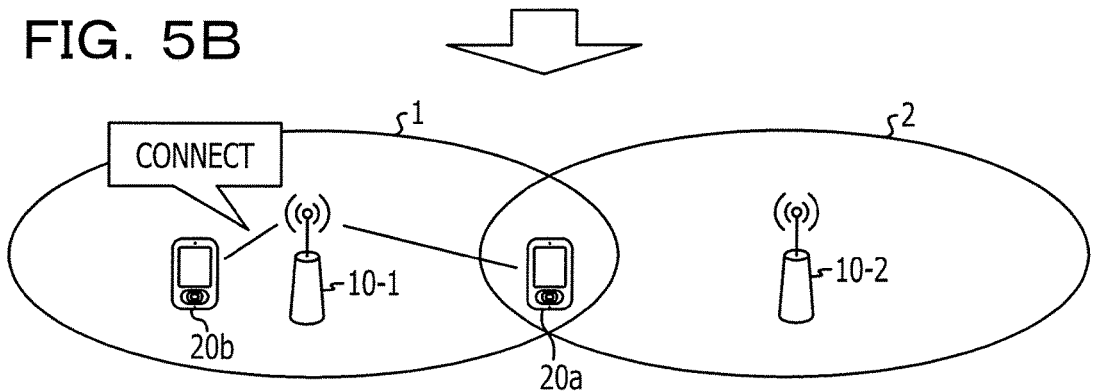
Figure 5C:
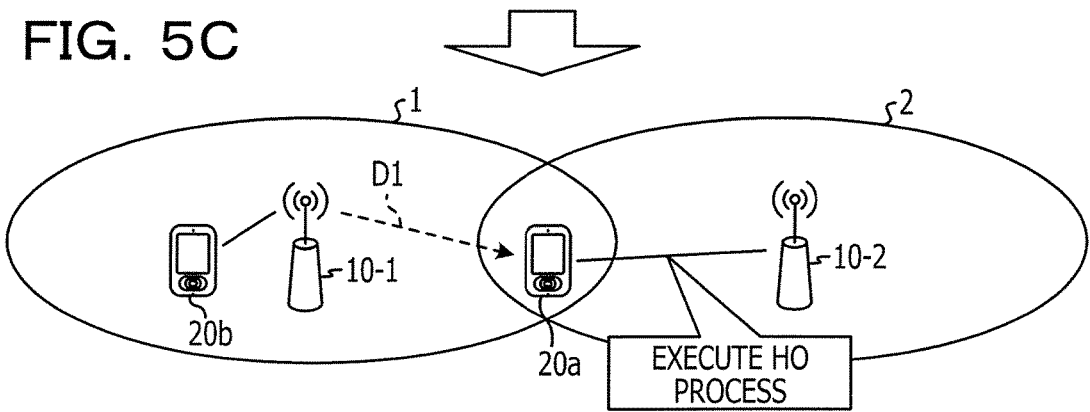

Next, a flow of processing in which the femto base station 10-1 according to the present embodiment connects an unconnected mobile station to the femto cell 1 and then makes a mobile station selected as an HO candidate to execute an HO process will be described with reference to FIGS. 5A to 5C. FIGS. 5A to 5C are diagrams illustrating a flow of processing in which the femto base station 10-1 according to the first embodiment connects an unconnected mobile station to the femto cell 1 and then makes a mobile station selected as an HO candidate to execute an HO process. In the example illustrated in FIGS. 5A to 5C, it is assumed that the threshold $N_{max}$ indicating the number of mobile stations that are connectable to the femto cell 1 is "1" and the threshold $N_{max}$ is set to a smaller value than the maximum number of connections, M. It is also assumed that the mobile station 20a is currently connected to the femto cell 1.

Upon receiving a connection request R1 (see FIG. 5A) transmitted from the mobile station 20b, which is an unconnected mobile station that is located in the femto cell 1 but is not connected to the femto cell 1, the femto base station 10-1 connects the mobile station 20b to the femto cell 1 (see FIG. 5B).

After the mobile station 20b is connected to the femto cell 1, the femto base station 10-1 monitors the number of connected mobile stations and determines whether or not the monitored number of connected mobile stations, $N_{UE}$, exceeds the threshold $N_{max}$="1". In FIG. 5B, since the number of connected mobile stations, $N_{UE}$="2", exceeds the threshold $N_{max}$="1", the femto base station 10-1 selects an HO candidate from the mobile stations 20a and 20b, which are connected mobile stations. In this case, it is assumed that the mobile station 20a located at the cell border between the femto cell 1 and the adjacent cell 2 is selected, as an HO candidate, from the mobile stations 20a and 20b, which are connected mobile stations. The femto base station 10-1 then performs control for reducing the transmission power so that, of transmission signals transmitted from the femto cell 1, signals that arrive at the mobile station 20a selected as the HO candidate decrease.

Subsequently, the femto base station 10-1 transmits, to the mobile station 20a selected as the HO candidate, an command signal D1 for issuing an command for executing an HO process, to thereby cause the mobile station 20a to execute the HO process for switching the connection destination thereof from the femto cell 1 to the adjacent cell 2 (see FIG. 5C).

Next, a procedure of the HO control processing performed by the femto base station 10-1 according to the present embodiment will be described with reference to FIG. 6. FIG. 6 is a flowchart illustrating a procedure of the HO control processing performed by the femto base station 10-1 according to the first embodiment.

As illustrated in FIG. 6, if a connection request from an unconnected mobile station is not received (NO in step S101), the call connection unit 16 in the femto base station 10-1 returns the process to step S101. If a connection request from an unconnected mobile station is received (YES in step S101), the call connection unit 16 determines whether or not the number of connected mobile stations, $N_{UE}$, is smaller than the maximum number of connections, M (step S102). If the number of connected mobile stations, $N_{UE}$, is larger than or equal to the maximum number of connections, M (NO in step S102), the call connection unit 16 advances the process to step S105.

On the other hand, if the number of connected mobile stations, $N_{UE}$, is smaller than the maximum number of connections, M (YES in step S102), the call connection unit 16 connects the unconnected mobile station to the femto cell 1 (step S103).

Thereafter, based on a monitoring result obtained by the number-of-connected-mobile-stations monitoring unit 12, the HO-candidate selecting unit 13 determines whether or not the number of connected mobile stations, $N_{UE}$, exceeds the threshold $N_{max}$ indicating the number of mobile stations that are connectable to the femto cell 1 (step S104). If the number of connected mobile stations, $N_{UE}$, does not exceed the threshold $N_{max}$ (NO in step S104), the HO-candidate selecting unit 13 ends the processing.

On the other hand, if the number of connected mobile stations, $N_{UE}$, exceeds the threshold $N_{max}$ (YES in step S104), the HO-candidate selecting unit 13 advances the process to step S105 for HO-candidate selection processing, transmission-power control processing, and HO command processing.

Figure 7:
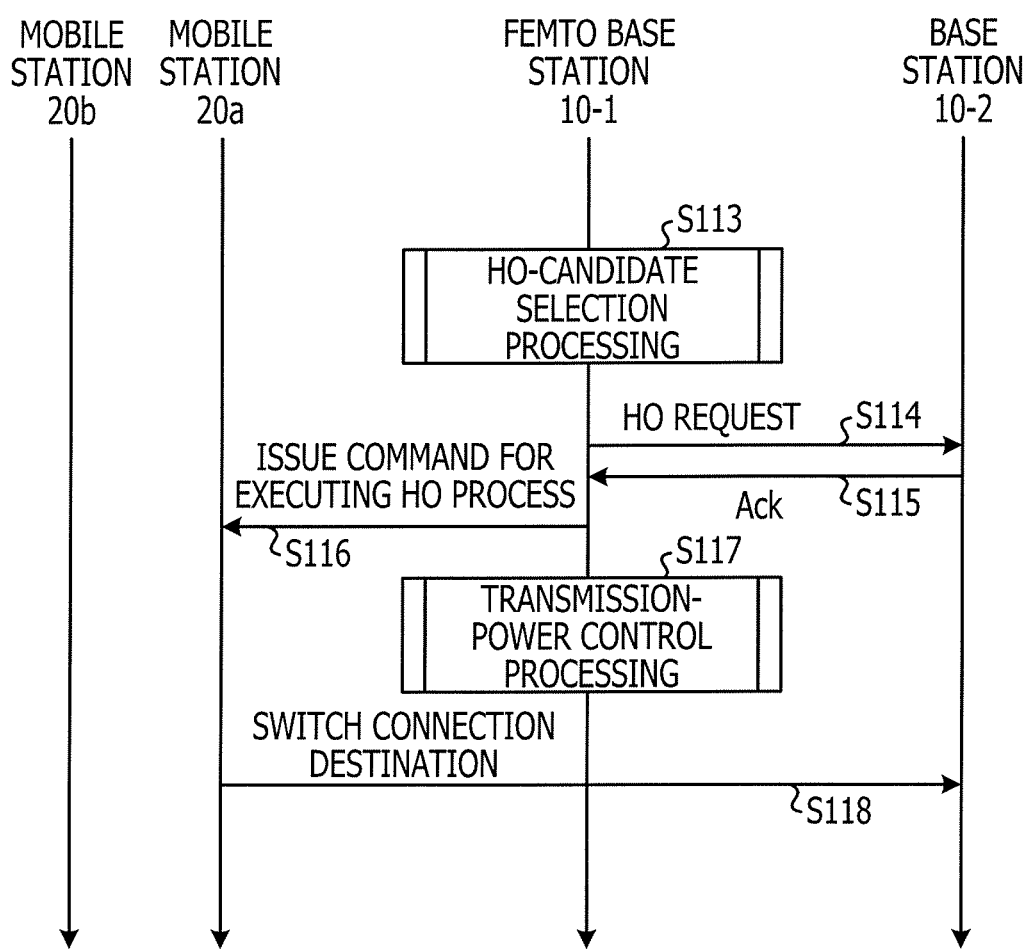
FIG. 7 is a sequence diagram illustrating an example of the overall flow of HO-candidate selection processing, transmission-power control processing, and HO command processing performed by the femto base station according to the first embodiment.

Next, an example of an overall flow of the HO-candidate selection processing, the transmission-power control processing, and the HO command processing in step S105 illustrated in FIG. 6 will be described with reference to FIG. 7. FIG. 7 is a sequence diagram illustrating an example of the overall flow of the HO-candidate selection processing, the transmission-power control processing, and the HO command processing performed by the femto base station 10-1 according to the first embodiment.

As illustrated in FIG. 7, the HO-candidate selecting unit 13 in the femto base station 10-1 executes the HO-candidate selection processing (step S113).

Figure 8:
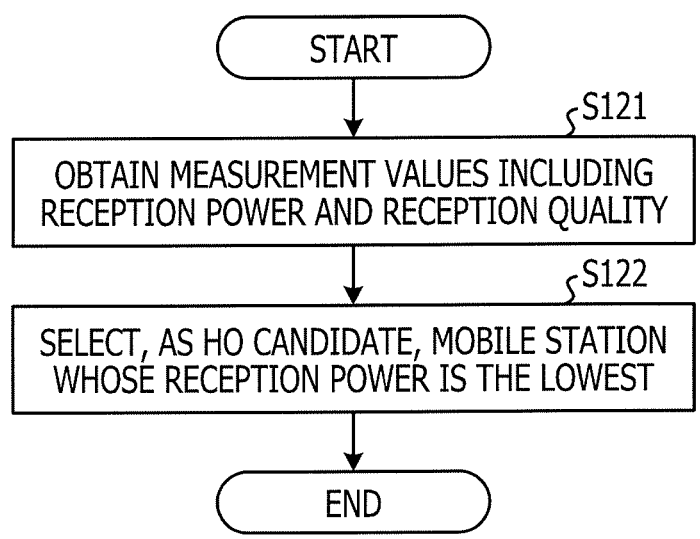
FIG. 8 is a flowchart illustrating a procedure of the HO-candidate selection processing performed by the femto base station according to the first embodiment.

Now, a procedure of the HO-candidate selection processing in step S113 illustrated in FIG. 7 will be described with reference to FIG. 8. FIG. 8 is a flowchart illustrating the procedure of the HO-candidate selection processing performed by the femto base station 10-1 according to the first embodiment.

As illustrated in FIG. 8, the HO-candidate selecting unit 13 in the femto base station 10-1 obtains measurement values that the mobile stations 20a and 20b, which are connected mobile stations, have reported in response to the measurement command (step S121). The measurement values reported from each of the connected mobile stations include, for example, reception power for transmission signals transmitted from the femto cell 1 and a reception quality for transmission signals transmitted from the femto cell 1. The HO-candidate selecting unit 13 holds the obtained measurement values for each connected mobile station.

The HO-candidate selecting unit 13 selects, as an HO candidate, a mobile station that is included in the mobile stations 20a and 20b, which are connected mobile stations, and whose reception power or reception quality for the transmission signals transmitted from the femto cell 1 is minimized (step S122). In the present embodiment, it is assumed that the HO-candidate selecting unit 13 selects, as an HO candidate, the mobile station 20a whose reception power for the transmission signals transmitted from the femto cell 1 is minimized. Upon completing the HO-candidate selection, the HO-candidate selecting unit 13 outputs a selection completion notification and information of the HO candidate to the transmission-power control unit 14 and the HO command unit 15.

Now, a description will be given while referring back to FIG. 7. Upon receiving the selection completion notification and the HO-candidate information from the HO-candidate selecting unit 13, the HO command unit 15 transmits, to the base station 10-2 that forms the adjacent cell 2, an HO request for requesting that the mobile station 20a selected as the HO candidate be connected to the adjacent cell 2 (step S114). Upon receiving the HO request, the base station 10-2 transmits, to the femto base station 10-1, an Ack response, which is an acknowledgement response for acknowledging the HO request (step S115).

If the Ack response is received from the base station 10-2, the HO command unit 15 transmits, to the mobile station 20a selected as the HO candidate, an command signal for issuing an command for executing an HO process (step S116). Thereafter, the transmission-power control unit 14 executes the transmission-power control processing (step S117).

Figure 9:
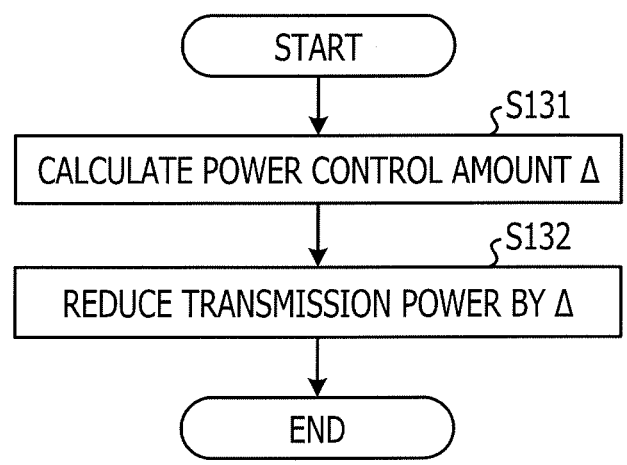
FIG. 9 is a flowchart illustrating a procedure of the transmission-power control processing performed by the femto base station according to the first embodiment.

Now, a procedure of the transmission-power control processing illustrated in FIG. 7 will be described with reference to FIG. 9. FIG. 9 is a flowchart illustrating the procedure of the transmission-power control processing performed by the femto base station 10-1 according to the first embodiment.

As illustrated in FIG. 9, upon being triggered by the selection completion notification from the HO-candidate selecting unit 13, the transmission-power control unit 14 in the femto base station 10-1 calculates a power control amount Δ (step S131). For example, the transmission-power control unit 14 estimates an $SINR_{D\_TPC}$ corresponding to signals transmitted from the adjacent cell 2 to the mobile station 20a that is the HO candidate, when transmission signals are assumed to be transmitted from the femto cell 1 by using the transmission power reduced by a power control amount Δ to be calculated. The transmission-power control unit 14 then calculates the power control amount Δ with which the estimated $SINR_{D\_TPC}$ is made to match the target value $SINR_{target\_D}$.

The transmission-power control unit 14 performs control for reducing the transmission power by the calculated power control amount Δ (step S132).

Now, a description will be given while referring back to FIG. 7. After the transmission-power control unit 14 completes the transmission power control, the mobile station 20a selected as the HO candidate executes an HO process to switch the connection destination from the femto cell 1 to the adjacent cell 2 (step S118).

Although a case in which the process in step S117 is executed after the process in step S116 has been described in the example illustrated in FIG. 7, the process in step S116 may also be executed after the process in step S117.

Figure 10:
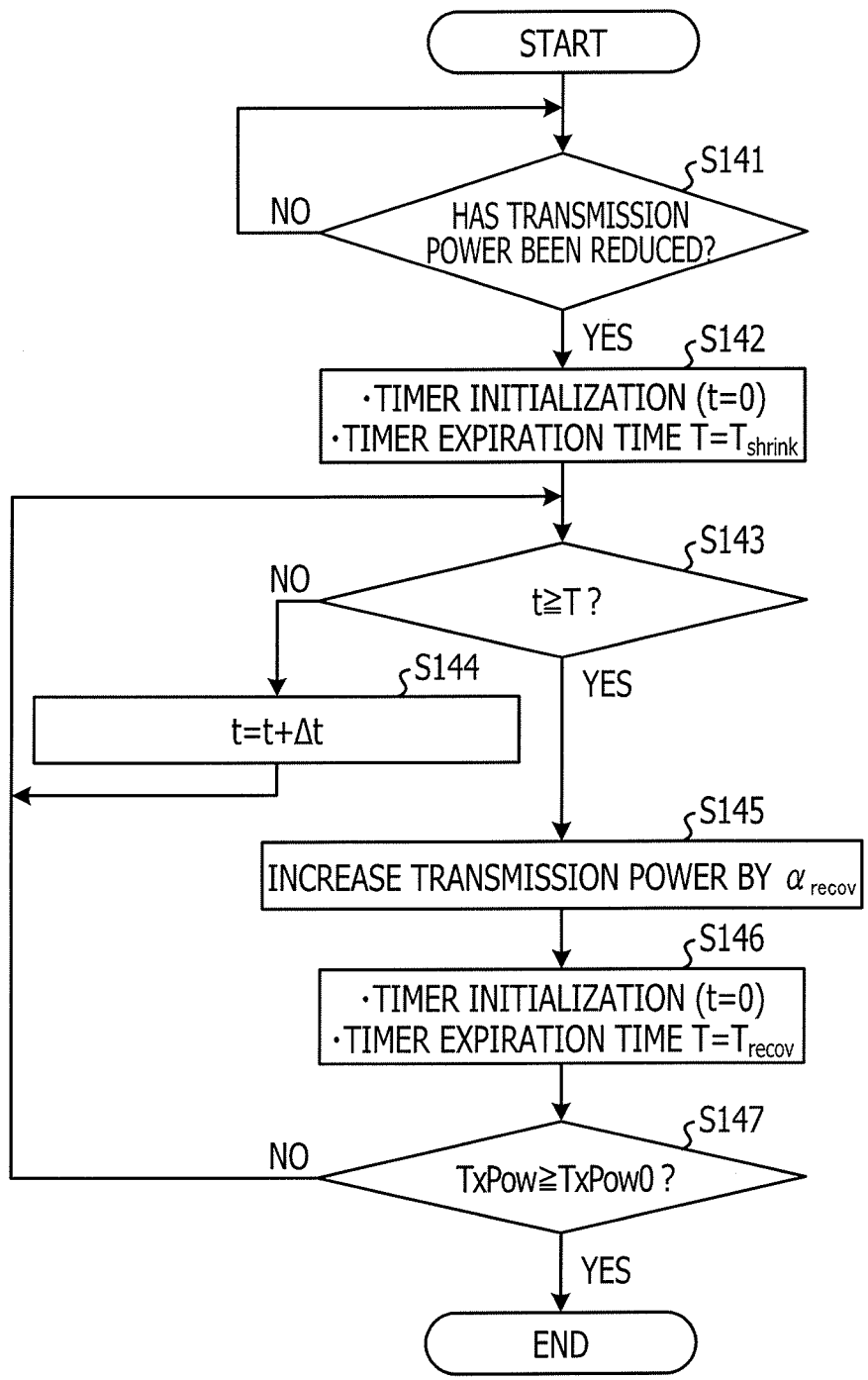
FIG. 10 is a flowchart illustrating a procedure of the transmission-power recovery processing performed by the femto base station according to the first embodiment.

Next, a procedure of the transmission-power recovery processing performed by the femto base station 10-1 according to the present embodiment will be described with reference to FIG. 10. FIG. 10 is a flowchart illustrating the procedure of the transmission-power recovery processing performed by the femto base station according to the first embodiment.

As illustrated in FIG. 10, if the transmission power has not been reduced (NO in step S141), the transmission-power control unit 14 in the femto base station 10-1 returns the process to step S141. On the other hand, if the transmission power has been reduced (YES in step S141), the transmission-power control unit 14 initializes a timer t and sets a predetermined time $T_{Shrink}$ for timer expiration time T (step S142).

The transmission-power control unit 14 determines whether or not the timer t is greater than or equal to the timer expiration time T (step S143). If the timer t is smaller than the timer expiration time T (NO in step S143), the transmission-power control unit 14 increments the timer t (step S144) and returns the process to step S143.

On the other hand, if the timer t is greater than or equal to the timer expiration time T (YES in step S143), the transmission-power control unit 14 increases the transmission power by $\alpha_{recov}$ (step S145). Thereafter, the transmission-power control unit 14 initializes the timer t and sets the period $T_{recov}$ for the timer expiration time T (step S146).

The transmission-power control unit 14 determines whether or not the transmission power TxPow is larger than or equal to the initial value TxPow0 (step S147). If the transmission power TxPow is smaller than the initial value TxPow0 (NO in step S147), the transmission-power control unit 14 returns the process to step S143. On the other hand, if the transmission power TxPow is larger than or equal to the initial value TxPow0 (YES in step S147), the transmission-power control unit 14 ends the processing.

As described above, when a large number of mobile stations concentrate in the femto cell 1 of the femto base station 10-1 in the present embodiment, the femto base station 10-1 selects an HO candidate from the large number of mobile stations, and controls a parameter related to transmission signals, based on the reception quality when the HO candidate is connected to the adjacent cell 2. Thus, the connection destination of the mobile station selected as the HO candidate can be appropriately switched to the adjacent cell 2, which is an HO destination, and it is also possible to reduce the level of signal interference from the femto cell 1, which is an HO source, to the adjacent cell 2, which is the HO destination. As a result, according to the present embodiment, when a large number of mobile stations concentrate in the femto cell 1 of the femto base station 10-1, it is possible to autonomously perform an HO process and it is also possible to reduce the signal interference due to a forcibly executed HO process caused by the control of the number of connections.

In addition, the femto base station 10-1 in the present embodiment selects, as an HO candidate, a mobile station that is included in the connected mobile stations and whose reception power or reception quality for transmission signals transmitted from the femto cell 1 is minimized. Thus, according to the present embodiment, a mobile station whose reception power or reception quality for transmission signals transmitted from the femto cell 1, which is an HO source, is favorable is allowed to stay in the femto cell 1, which is an HO source, with high priority.

Also, the femto base station 10-1 in the present embodiment executes control for reducing the transmission power used for transmitting transmission signals, the transmission power being a parameter related to the transmission signals. Thus, according to the present embodiment, it is possible to easily reduce, of transmission signals transmitted from the femto cell 1, signals that arrive at the mobile station 20a selected as the HO candidate, thus making it possible efficiently reduce the coverage of the femto cell 1.

Also, the femto base station 10-1 in the present embodiment estimates a reception quality for signals transmitted from the adjacent cell 2 to the mobile station 20a selected as the HO candidate, when transmission signals are assumed to be transmitted from the femto cell 1 by using transmission power reduced by the power control amount to be calculated. The femto base station 10-1 then calculates a power control amount with which the estimated reception quality is made to match a target value, and performs control for reducing the transmission power, based on the calculated power control amount. Thus, according to the present embodiment, it is possible to reduce signal interference between the femto cell 1, which is an HO source, and the adjacent cell 2, which is an HO destination, while maintaining, at the target value, the reception quality for signals transmitted from the adjacent cell 2 to a mobile station selected as an HO candidate.

The femto base station 10-1 in the present embodiment estimates a reception quality for transmission signals transmitted from the femto cell 1 to a mobile station that is not the HO candidate, when transmission signals are assumed to be transmitted from the femto cell 1 by using the transmission power reduced by the power control amount to be calculated. The femto base station 10-1 specifies the upper limit of the power control amount so that the estimated reception quality does not fall below the predetermined lower-limit value. Thus, according to the present embodiment, it is possible to appropriately maintain the communication quality of a mobile station that is not selected as the HO candidate, that is, a mobile station that stays in the femto cell 1.

Also, when a predetermined time has passed after starting to execute the control for reducing the transmission power, the femto base station 10-1 in the present embodiment recovers the reduced transmission power to the value before executing the control. Thus, according to the present embodiment, when the predetermined time has passed after starting to execute the control for reducing the transmission power, the size of the coverage of the femto cell 1, the size being reduced as a result of the reduction of the transmission power, can be recovered to the initial size.

Also, the femto base station 10-1 in the present embodiment transmits, to the base station 10-2 that forms the adjacent cell 2, an HO request for requesting that the mobile station selected as the HO candidate be connected to the adjacent cell 2. Upon receiving, from the base station 10-2, an acknowledgement response for acknowledging the HO request, the femto base station 10-1 instructs the mobile station selected as the HO candidate to execute an HO process. Thus, according to the present embodiment, under the initiative of the femto base station 10-1, which is an HO source, it is possible to cause a mobile station, which is an HO candidate, to appropriately execute an HO process.

Also, after an unconnected mobile station that has transmitted a connection request is connected to the femto cell 1 to become a connected mobile station, the femto base station 10-1 in the present embodiment determines whether or not the number of connected mobile stations exceeds the threshold $N_{max}$. When the number of connected mobile stations exceeds the threshold $N_{max}$, the femto base station 10-1 causes the mobile station selected as the HO candidate to execute an HO process. Thus, according to the present embodiment, after an unconnected mobile station is connected to the femto cell 1, the connection destination of an HO candidate selected connected mobile stations can be switched from the femto cell 1 to the adjacent cell 2.

Second Embodiment

A description in the first embodiment has been given of an example in which a mobile station that is included in mobile stations currently connected to the femto cell 1 and whose reception power or reception quality for transmission signals transmitted from the femto cell 1 is minimized (namely the worst) is selected as an HO candidate. A mobile station that is included in mobile stations currently connected to the femto cell 1 and whose reception power or reception quality for signals transmitted from the adjacent cell is maximized may also be selected as an HO candidate. In a second embodiment, a description will be given of an example in which a mobile station that is included in mobile stations currently connected to the femto cell 1 and whose reception power or reception quality for signals transmitted from the adjacent cell is maximized (namely the best) is selected as an HO candidate.

Figure 11:
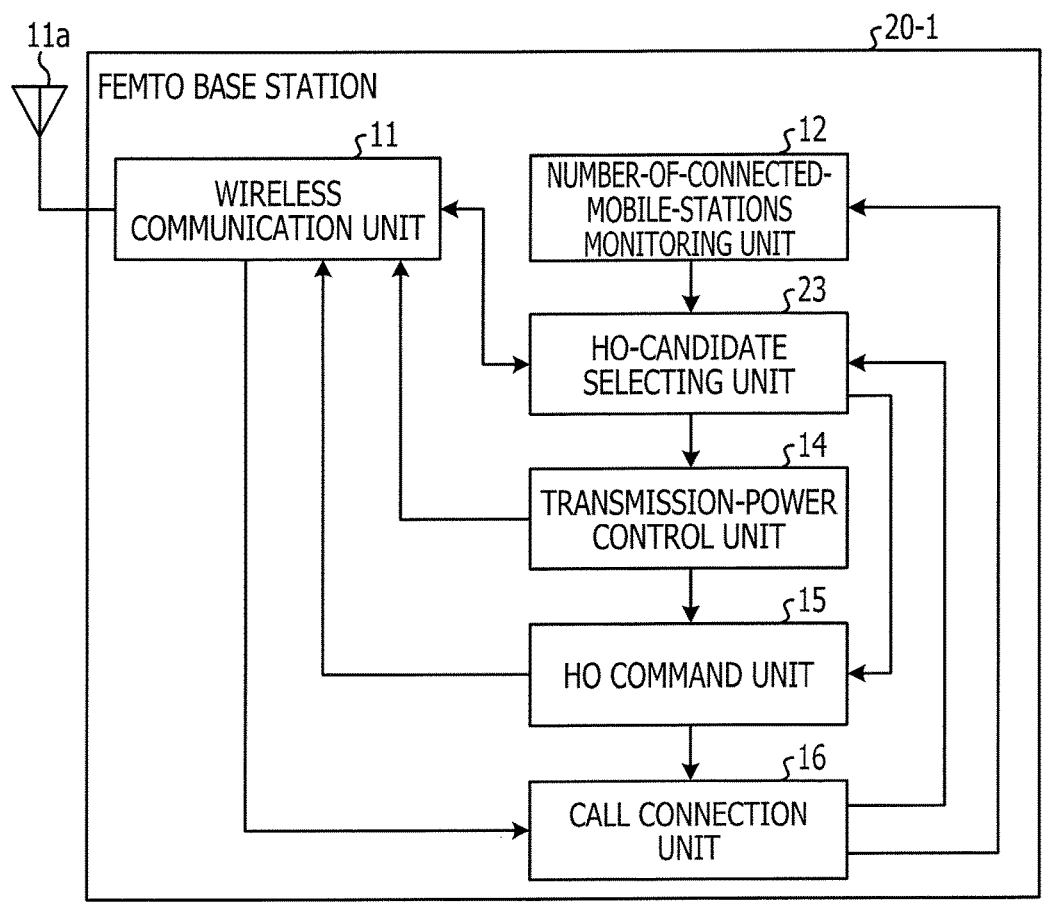
FIG. 11 is a block diagram illustrating the configuration of a femto base station according to a second embodiment.

FIG. 11 is a block diagram illustrating the configuration of a femto base station according to the second embodiment. In FIG. 11, elements that are the same as or similar to those in FIG. 2 are denoted by the same reference numerals, and descriptions thereof are not given hereinafter. As illustrated in FIG. 11, a femto base station 20-1 according to the present embodiment has an HO-candidate selecting unit 23, instead of the HO-candidate selecting unit 13 illustrated in FIG. 2.

The HO-candidate selecting unit 23 receives a monitoring result input from the number-of-connected-mobile-stations monitoring unit 12. The HO-candidate selecting unit 23 receives, from the call connection unit 16, a notification indicating the timing at which an unconnected mobile station was connected to the femto cell 1. After the call connection unit 16 connects the unconnected mobile station to the femto cell 1, the HO-candidate selecting unit 23 determines whether or not the number of connected mobile stations, $N_{UE}$, has exceeded the threshold $N_{max}$ indicating the number of mobile stations that are connectable to the femto cell 1, based on a monitoring result. It is assumed that the threshold $N_{max}$ in the present embodiment has been set to a value that is an upper limit of the number of mobile stations that are connectable to the femto cell 1 and that is smaller than a maximum number of connections, M, indicating an upper limit pre-specified as an apparatus specification of the femto base station 20-1. When the number of connected mobile stations has exceeded the threshold $N_{max}$, the HO-candidate selecting unit 23 selects an HO candidate from the connected mobile stations.

Now, a description will be given of details of the HO-candidate selection processing performed by the HO-candidate selecting unit 23. When the number of connected mobile stations exceeds the threshold $N_{max}$, the HO-candidate selecting unit 23 transmits, to each of the connected mobile stations via the wireless communication unit 11, a measurement command indicating that measure measurement values including reception power, a reception quality, and so on are to be measured and to be transmitted to the femto base station 20-1. The HO-candidate selecting unit 23 obtains, via the wireless communication unit 11, the measurement values that the connected mobile stations have reported in response to the measurement command. The measurement values reported by each of the connected mobile stations include, for example, reception power $P_S$ for transmission signals transmitted from the femto cell 1, a reception quality $SINR_S$ for transmission signals transmitted from the femto cell 1, and reception power $P_D$ for signals transmitted from the adjacent cell 2. Based on the reception power $P_S$, the reception quality $SINR_S$, and the reception power $P_D$, the HO-candidate selecting unit 23 calculates a reception quality $SINR_D$ for the signals transmitted from the adjacent cell 2. The reception quality for the signals transmitted from the adjacent cell 2 refers to a reception quality when the connected mobile station is connected to the adjacent cell 2. The reception quality $SINR_D$ for the signals transmitted from the adjacent cell 2 is calculated using equation (5).

$$SINR_D = P_D - 10*\log10\left\{10^{\frac{P_S}{10}} + 10^{\frac{I}{10}}\right\} \quad (5)$$

I in equation (5) represents interference power including noise power and is calculated using equation (6) below.

$$I = 10*\log10\left\{10^{\frac{P_S - SINR_S}{10}} + 10^{\frac{P_D}{10}}\right\} \quad (6)$$

Subsequently, the HO-candidate selecting unit 23 selects, as an HO candidate, a mobile station that is included in the connected mobile stations and whose reception power $P_D$ or reception quality $SINR_D$ for the signals transmitted from the adjacent cell 2 is the highest. According to the present embodiment, the HO-candidate selecting unit 23 selects, as an HO candidate, a mobile station whose reception quality $SINR_D$ is the highest. Upon completing the HO-candidate selection, the HO-candidate selecting unit 23 outputs a selection completion notification and information of the HO candidate to the transmission-power control unit 14 and the HO command unit 15.

Figure 12:
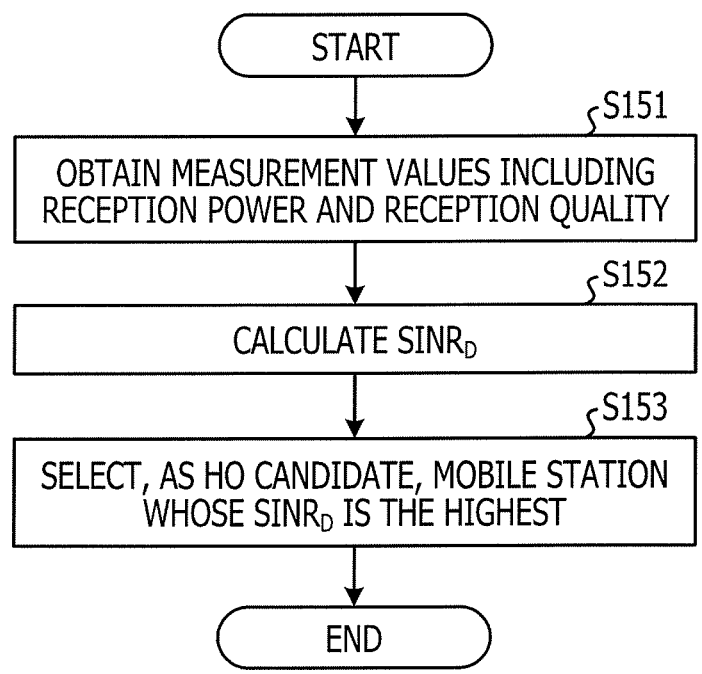
FIG. 12 is a flowchart illustrating a procedure of HO-candidate selection processing performed by the femto base station according to the second embodiment.

Next, a procedure of the HO-candidate selection processing performed by the femto base station 20-1 according to the present embodiment will be described with reference to FIG. 12. FIG. 12 is a flowchart illustrating the procedure of the HO-candidate selection processing performed by the femto base station according to the second embodiment. The procedure of the HO-candidate selection processing illustrated in the flowchart in FIG. 12 corresponds to the procedure of the HO-candidate selection processing in step S113 illustrated in FIG. 7.

As illustrated in FIG. 12, the HO-candidate selecting unit 23 in the femto base station 20-1 obtains measurement values that the mobile stations 20a and 20b, which are connected mobile stations, have reported in response to the measurement command (step S151). The measurement values reported by each of the connected mobile stations include, for example, the reception power $P_S$ for transmission signals transmitted from the femto cell 1, the reception quality $SINR_S$ for transmission signals transmitted from the femto cell 1, and the reception power $P_D$ for signals transmitted from the adjacent cell 2. The HO-candidate selecting unit 23 holds the obtained measurement values for each connected mobile station.

Based on the reception power $P_S$, the reception quality $SINR_S$, and the reception power $P_D$, the HO-candidate selecting unit 23 calculates a reception quality $SINR_D$ when each connected mobile station is connected to the adjacent cell 2 (step S152). For example, the HO-candidate selecting unit 23 calculates the reception quality $SINR_D$ for each connected mobile station by using equation (5).

The HO-candidate selecting unit 23 selects, as an HO candidate, a mobile station that is included in the connected mobile stations and whose reception power $P_D$ or reception quality $SINR_D$ for the signals transmitted from the adjacent cell 2 is the highest (step S153). In the present embodiment, the HO-candidate selecting unit 23 selects, as an HO candidate, a mobile station whose reception quality $SINR_D$ is the highest. Upon completing the HO-candidate selection, the HO-candidate selecting unit 23 outputs a selection completion notification and information of the HO candidate to the transmission-power control unit 14 and the HO command unit 15.

As described above, the femto base station 20-1 in the present embodiment selects, as an HO candidate, a mobile station that is included in the connected mobile stations and whose reception power or reception quality for signals transmitted from the adjacent cell 2 is the highest. Thus, according to the present embodiment, the connection destination of a mobile station whose reception power or reception quality for signals transmitted from the adjacent cell 2 is favorable can be switched to the adjacent cell 2 with high priority. As a result, it is possible to efficiently reduce signal interference due to the HO process.

Third Embodiment

The description in the second embodiment has been given of an example in which a mobile station that is included in mobile stations currently connected to the femto cell 1 and whose reception power or reception quality for signals transmitted from the adjacent cell 2 is the highest is selected as an HO candidate. However, when the reception power or the reception quality of the mobile station selected as the HO candidate, the reception power or the reception quality being used for signals transmitted from the adjacent cell 2, does not satisfy a predetermined value, a mobile station whose reception power or reception quality for transmission signals transmitted from the femto cell 1 may also be newly selected (or reselected) as the HO candidate. Accordingly, in a third embodiment, a description will be given of an example in which, when the reception power or the reception quality of the mobile station selected as the HO candidate, the reception power or the reception quality being used for signals transmitted from the adjacent cell 2, does not satisfy a predetermined value, a mobile station whose reception power or reception quality for transmission signals transmitted from the femto cell 1 is the lowest is newly selection as the HO candidate.

Figure 13:
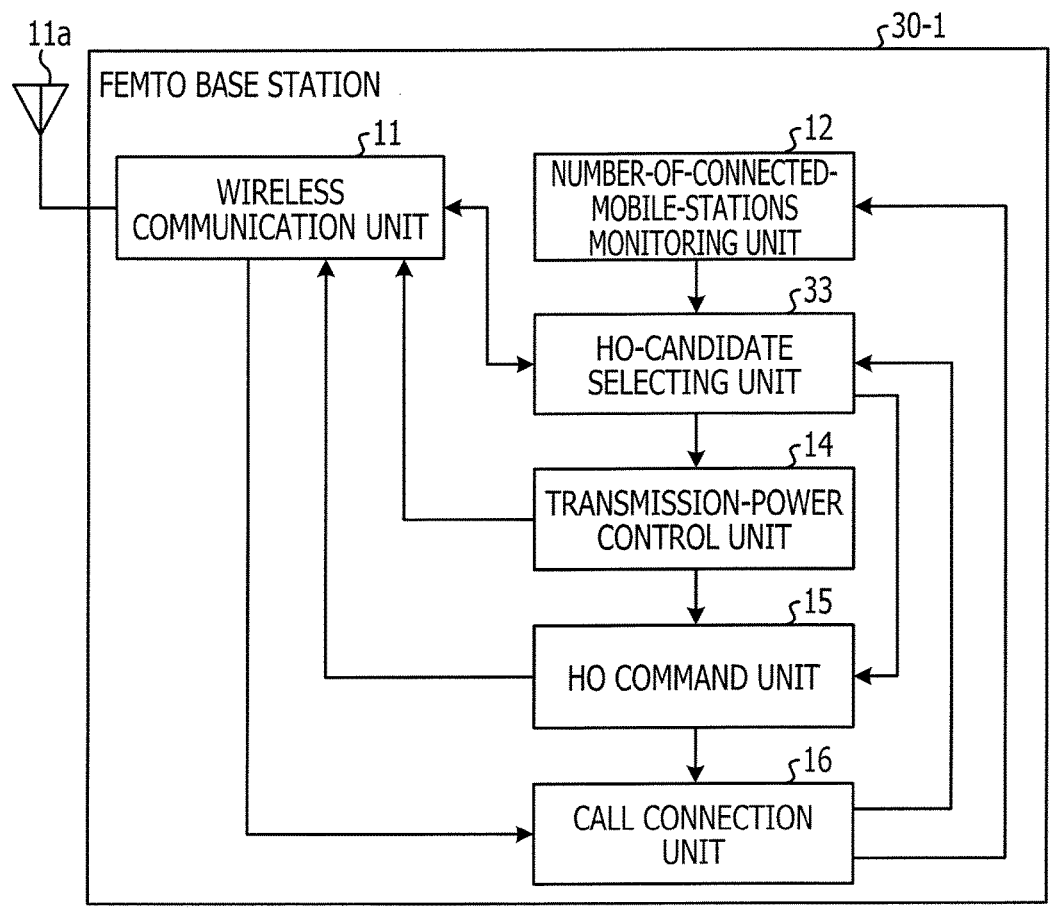
FIG. 13 is a block diagram illustrating the configuration of a femto base station according to a third embodiment.

FIG. 13 is a block diagram illustrating the configuration of a femto base station according to the third embodiment. In FIG. 13, elements that are the same as or similar to those in FIG. 11 are denoted by the same reference numerals, and descriptions thereof are not given hereinafter. As illustrated in FIG. 13, a femto base station 30-1 according to the present embodiment has an HO-candidate selecting unit 33, instead of the HO-candidate selecting unit 23 illustrated in FIG. 11.

Similarly to the HO-candidate selecting unit 23 illustrated in FIG. 11, the HO-candidate selecting unit 33 selects, as an HO candidate, a mobile station that is included in connected mobile stations and whose reception power $P_D$ or reception quality $SINR_D$ for signals transmitted from the adjacent cell 2 is the highest.

In addition, the HO-candidate selecting unit 33 determines whether or not the reception power $P_D$ or the reception quality $SINR_D$ of the mobile station selected as the HO candidate satisfies a predetermined value. When the reception power $P_D$ or the reception quality $SINR_D$ does not satisfy the predetermined value, the HO-candidate selecting unit 33 newly selects, as the HO candidate, a mobile station that is included in the connected mobile stations and whose reception power or reception quality for transmission signals transmitted from the femto cell 1 is the lowest. Upon completing the HO-candidate selection, the HO-candidate selecting unit 33 outputs a selection completion notification and information of the HO candidate to the transmission-power control unit 14 and the HO command unit 15.

Figure 14:
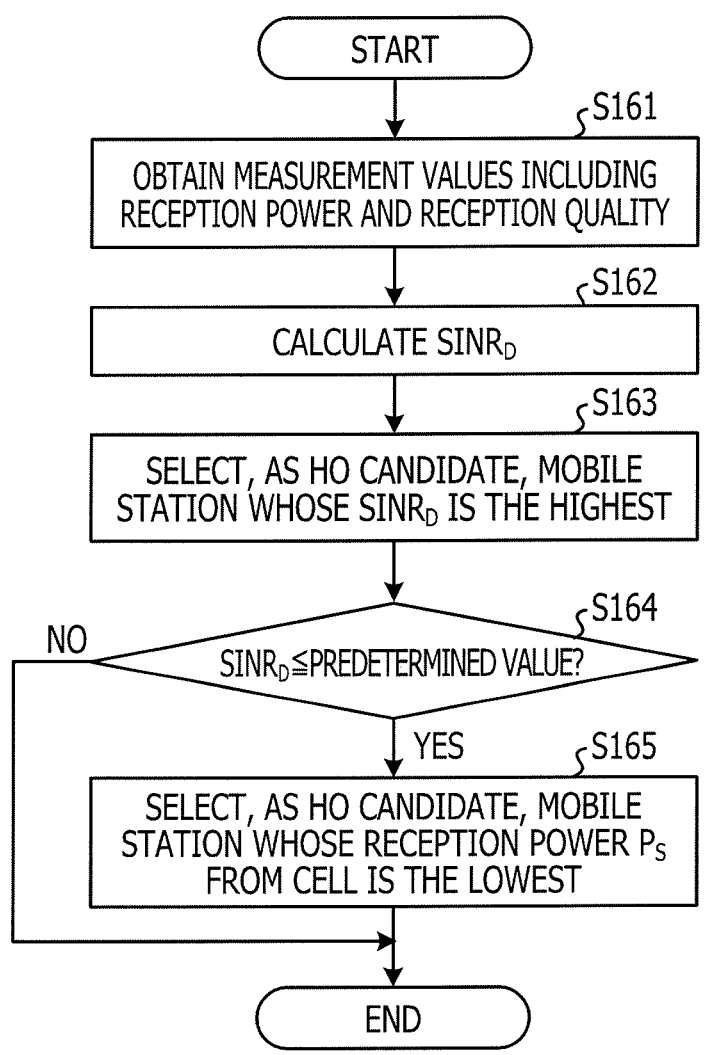
FIG. 14 is a flowchart illustrating a procedure of HO-candidate selection processing performed by the femto base station according to the third embodiment.

Next, a procedure of the HO-candidate selection processing performed by the femto base station 30-1 according to the present embodiment will be described with reference to FIG. 14. FIG. 14 is a flowchart illustrating the procedure of the HO-candidate selection processing performed by the femto base station 30-1 according to the third embodiment. The procedure of the HO-candidate selection processing illustrated in the flowchart FIG. 14 corresponds to the procedure of the HO-candidate selection processing in step S113 illustrated in FIG. 7.

As illustrated in FIG. 14, the HO-candidate selecting unit 33 in the femto base station 30-1 obtains measurement values that the mobile stations 20a and 20b, which are connected mobile station, have reported in response to the measurement command (step S161). The measurement values reported by each of the connected mobile stations include, for example, the reception power $P_S$ for transmission signals transmitted from the femto cell 1, the reception quality $SINR_S$ for transmission signals transmitted from the femto cell 1, and the reception power $P_D$ for signals transmitted from the adjacent cell 2. The HO-candidate selecting unit 33 holds the obtained measurement values for each connected mobile station.

Based on the reception power $P_S$, the reception quality $SINR_S$, and the reception power $P_D$, the HO-candidate selecting unit 33 calculates a reception quality $SINR_D$ for the signals transmitted from the adjacent cell 2 (step S162). For example, the HO-candidate selecting unit 33 calculates the reception quality $SINR_D$ for each connected mobile station by using equation (5) noted above.

The HO-candidate selecting unit 33 selects, as an HO candidate, a mobile station that is included in the connected mobile stations and whose reception power $P_D$ or reception quality $SINR_D$ for the signals transmitted from the adjacent cell 2 is maximized (step S163). In the present embodiment, the HO-candidate selecting unit 33 selects, as an HO candidate, a mobile station whose reception quality $SINR_D$ is maximized.

The HO-candidate selecting unit 33 determines whether or not the reception power $P_D$ or the reception quality $SINR_D$ of the mobile station selected as the HO candidate satisfies a predetermined value (step S164). If the reception power $P_D$ or the reception quality $SINR_D$ of the mobile station selected as the HO candidate satisfies the predetermined value (NO in step S164), the HO-candidate selecting unit 33 ends the processing without newly selecting an HO candidate.

On the other hand, if the reception power $P_D$ or the reception quality $SINR_D$ does not satisfy the predetermined value, the HO-candidate selecting unit 33 performs the following process (YES in step S164). That is, the HO-candidate selecting unit 33 newly selects, as the HO candidate, a mobile station whose reception power $P_S$ or reception quality $SINR_S$ for the transmission signals transmitted from the femto cell 1 is minimized (step S165). In the present embodiment, the HO-candidate selecting unit 33 newly selects, as the HO candidate, a mobile station whose reception power $P_S$ is minimized. Upon completing the HO-candidate selection, the HO-candidate selecting unit 33 outputs a selection completion notification and information of the HO candidate to the transmission-power control unit 14 and the HO command unit 15.

As described above, the femto base station 30-1 in the present embodiment selects, as an HO candidate, a mobile station that is included in connected mobile stations and whose reception power or reception quality for signals transmitted from the adjacent cell 2 is maximized. When the reception power or the reception quality of the mobile station selected as the HO candidate, the reception power or the reception quality being used for signals transmitted from the adjacent cell 2, does not satisfy the predetermined value, the femto base station 30-1 newly selects, as the HO candidate, a mobile station whose reception power or reception quality for transmission signals transmitted from the femto cell 1 is minimized. Hence, according to the present embodiment, when the reception power or the reception quality of the mobile station selected as the HO candidate, the reception power or the reception quality being used for signals transmitted from the adjacent cell 2, does not satisfy the predetermined value, a mobile station whose reception power or reception quality for transmission signals transmitted from a cell, which is an HO source, is the worst can be newly selected as the HO candidate.

Fourth Embodiment

In the first embodiment, a description has been give of an example in which, when a predetermined time has passed after starting to execute the control for reducing the transmission power, the reduced transmission power is recovered to the value before executing the control. However, in the period in which the control for reducing the transmission power is executed, the reduced transmission power may also be recovered to the value before executing the control, when the number of connected mobile stations becomes smaller than or equal to the threshold $N_{max}$. Accordingly, a description in a fourth embodiment will be given of an example in which, when the number of connected mobile stations becomes smaller than or equal to the threshold $N_{max}$ in the period in which the control for reducing the transmission power is executed, the reduced transmission power is recovered to the value before executing the control.

Figure 15:
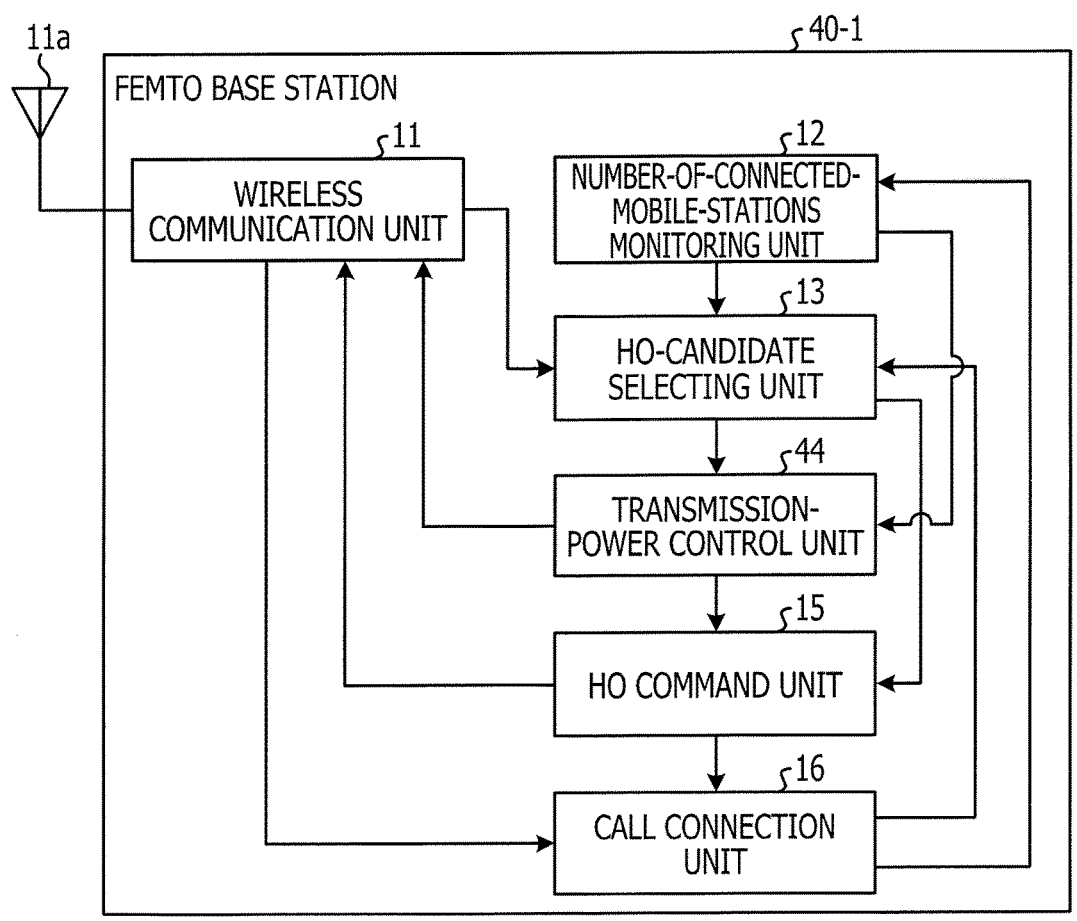
FIG. 15 is a block diagram illustrating the configuration of a femto base station according to a fourth embodiment.

FIG. 15 is a block diagram illustrating the configuration of a femto base station according to the fourth embodiment. In FIG. 15, elements that are the same as or similar to those in FIG. 2 are denoted by the same reference numerals, and descriptions thereof are not given hereinafter. As illustrated in FIG. 15, a femto base station 40-1 according to the present embodiment has a transmission-power control unit 44, instead of the transmission-power control unit 14 illustrated in FIG. 2.

The transmission-power control unit 44 receives a selection completion notification and HO-candidate information from the HO-candidate selecting unit 13. Similarly to the transmission-power control unit 14 illustrated in FIG. 2, upon being triggered by the selection completion notification, the transmission-power control unit 44 performs control for reducing the transmission power so that, of transmission signals transmitted from the femto cell 1, signals that arrive at the mobile station selected as the HO candidate decrease. For example, the transmission-power control unit 44 performs control for reducing the transmission power by adjusting the gain of an amplifier built into the wireless communication unit 11 or by changing average amplitude of digital signal.

In addition, the transmission-power control unit 44 receives a monitoring result input from the number-of-connected-mobile-stations monitoring unit 12. In the period in which the control for reducing the transmission power is executed, based on the monitoring result, the transmission-power control unit 44 determines whether or not the number of connected mobile stations, $N_{UE}$, becomes smaller than or equal to the threshold $N_{max}$ indicating the number of mobile stations that are connectable to the femto cell 1. When the number of connected mobile stations, $N_{UE}$, becomes smaller than the threshold $N_{max}$, the transmission-power control unit 44 recovers the reduced transmission power to the value before executing the control.

Figure 16:
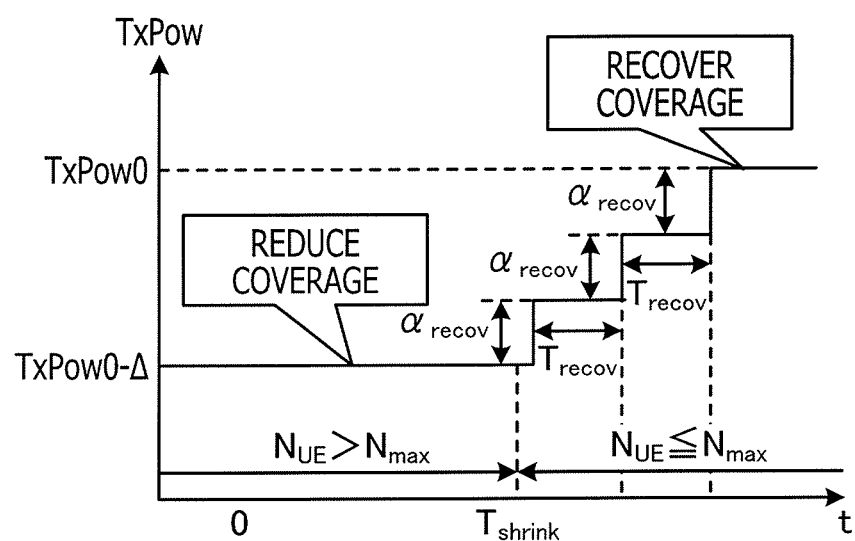
FIG. 16 is a schematic graph illustrating processing for recovering the transmission power.

However, if the transmission power recovers instantaneously to the value before executing the control, the level of interference between the transmission signals transmitted from the femto cell 1 and the signals transmitted from the adjacent cell 2 increases sharply. Accordingly, the transmission-power control unit 44 in the present embodiment recovers, in a stepwise manner, the reduced transmission power to the initial value before executing the control. More specifically, when the number of connected mobile stations, $N_{UE}$, becomes smaller than the threshold $N_{max}$, the transmission-power control unit 44 increases the transmission power in a stepwise manner in increments of $\alpha_{recov}$ at a period $T_{recov}$, with an initial value TxPow0 of the transmission power being the upper limit, as illustrated in FIG. 16. FIG. 16 is a schematic graph illustrating the processing for recovering the transmission power. In FIG. 16, the horizontal axis indicates time t, and the vertical axis indicates the transmission power TxPow. The transmission power TxPow is represented by equation (4) noted above.

Figure 17:
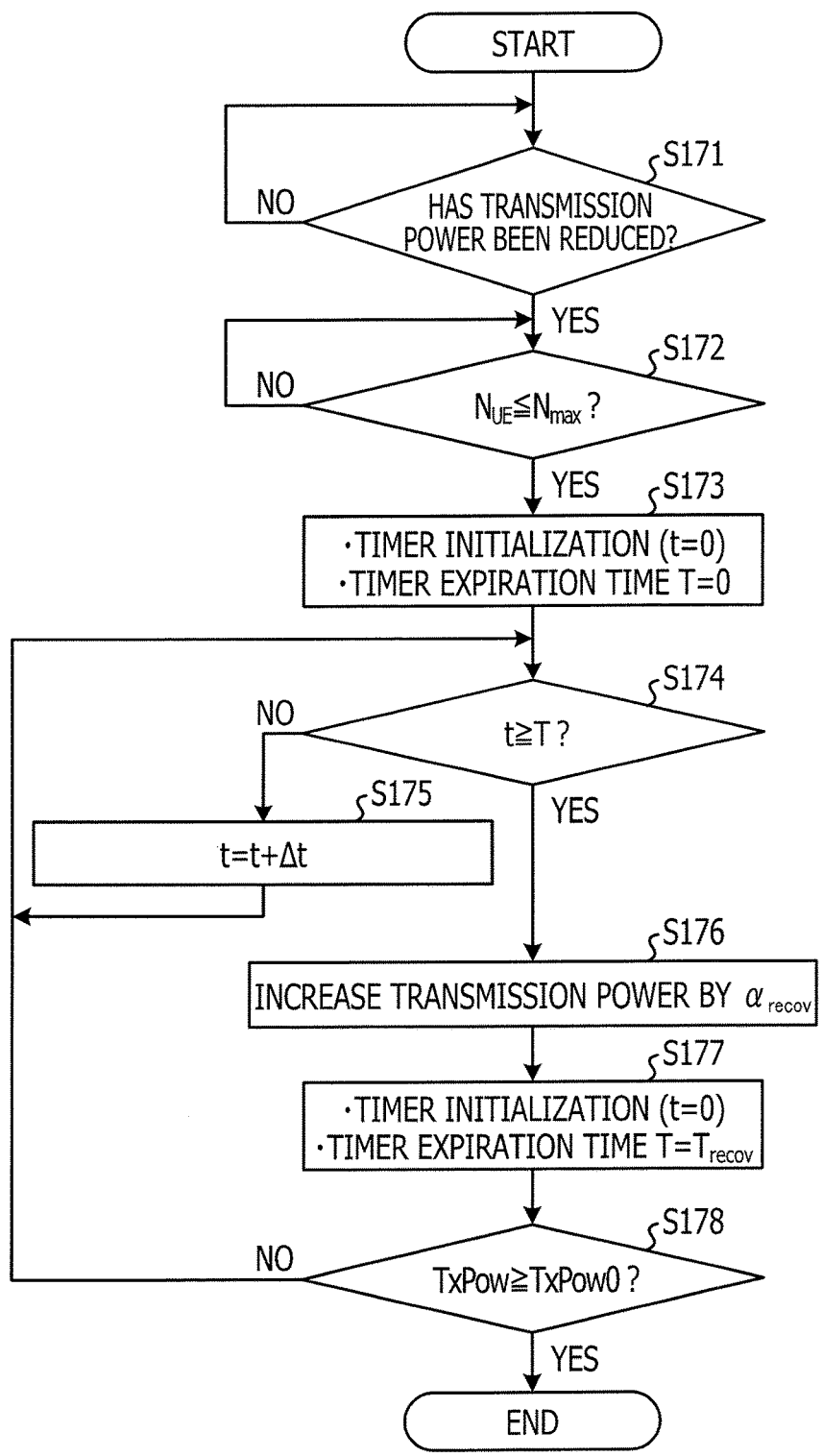
FIG. 17 is a flowchart illustrating a procedure of transmission-power recovery processing performed by the femto base station according to the fourth embodiment.

Next, a procedure of the transmission-power recovery processing performed by the femto base station 40-1 according to the present embodiment will be described with reference to FIG. 17. FIG. 17 is a flowchart illustrating the procedure of the transmission-power recovery processing performed by the femto base station according to the fourth embodiment.

As illustrated in FIG. 17, if the transmission power has not been reduced (NO in step S171), the transmission-power control unit 44 in the femto base station 40-1 returns the process to step S171. On the other hand, if the transmission power has been reduced (YES in step S171), the transmission-power control unit 44 determines whether or not the number of connected mobile stations, $N_{UE}$, becomes smaller than or equal to the threshold $N_{max}$ indicating the number of mobile stations that are connectable to the femto cell 1, based on a monitoring result (step S172).

If the number of connected mobile stations, $N_{UE}$, exceeds the threshold $N_{max}$ (NO in step S172), the transmission-power control unit 44 returns the process to step S172.

On the other hand, if the number of connected mobile stations, $N_{UE}$, becomes smaller than or equal to the threshold $N_{max}$ (YES in step S172), the transmission-power control unit 44 initializes the timer t and sets "0" for the timer expiration time T (step S173).

The transmission-power control unit 44 determines whether or not the timer t is greater than or equal to the timer expiration time T (step S174). If the timer t is smaller than the timer expiration time T (NO in step S174), the transmission-power control unit 44 increments the timer t (step S175) and returns the process to step S174.

On the other hand, if the timer t becomes larger than or equal to the timer expiration time T (YES in step S174), the transmission-power control unit 44 increases the transmission power by $α_{recov}$ (step S176). Thereafter, the transmission-power control unit 44 initializes the timer t and sets a period $T_{recov}$ for the timer expiration time T (step S177).

The transmission-power control unit 44 determines whether or not the transmission power TxPow is larger than or equal to the initial value TxPow0 (step S178). If the transmission power TxPow is smaller than the initial value TxPow0 (NO in step S178), the transmission-power control unit 44 returns the process to step S174. On the other hand, if the transmission power TxPow is larger than or equal to the initial value TxPow0, the transmission-power control unit 44 ends the processing (YES in step S178).

As described above, when the number of connected mobile stations becomes smaller than or equal to the threshold $N_{max}$ in the period in which the control for reducing the transmission power is executed, the femto base station 40-1 in the present embodiment recovers the reduced transmission power to the value before executing the control. Thus, according to the present embodiment, when the number of connected mobile stations becomes smaller than or equal to the threshold $N_{max}$ in the period in which the control for reducing the transmission power is executed, the size of the coverage of the femto cell 1, the size being reduced as a result of the reduction of the transmission power, can be recovered to the initial size.

Fifth Embodiment

The description in the first embodiment has been given of an example in which the threshold $N_{max}$ indicating the number of mobile stations that are connectable to the femto cell 1 is set to a value that is the upper limit of the number of mobile stations that are connectable to the femto cell 1 and that is smaller than the maximum number of connections, M, indicating the upper limit pre-specified as an apparatus specification of the femto base station 10-1. However, the threshold $N_{max}$ may also be set to the same value as the maximum number of connections, M. In such a case, the femto base station may also be adapted to determine whether or not the number of connected mobile stations exceeds the threshold $N_{max}$, before an unconnected mobile station that has transmitted a connection request is connected to the femto cell 1 to become a connected mobile station. In this case, it is assumed that a case in which the number of connected mobile stations exceeds the threshold $N_{max}$ includes a case in which the number of connected mobile stations becomes larger than or equal to the threshold $N_{max}$. Accordingly, a description in a fifth embodiment will be given of an example in which, before an unconnected mobile station that has transmitted a connection request is connected to the femto cell 1 to become a connected mobile station, a determination is made as to whether or not the number of connected mobile stations exceeds the threshold $N_{max}$.

Figure 18:
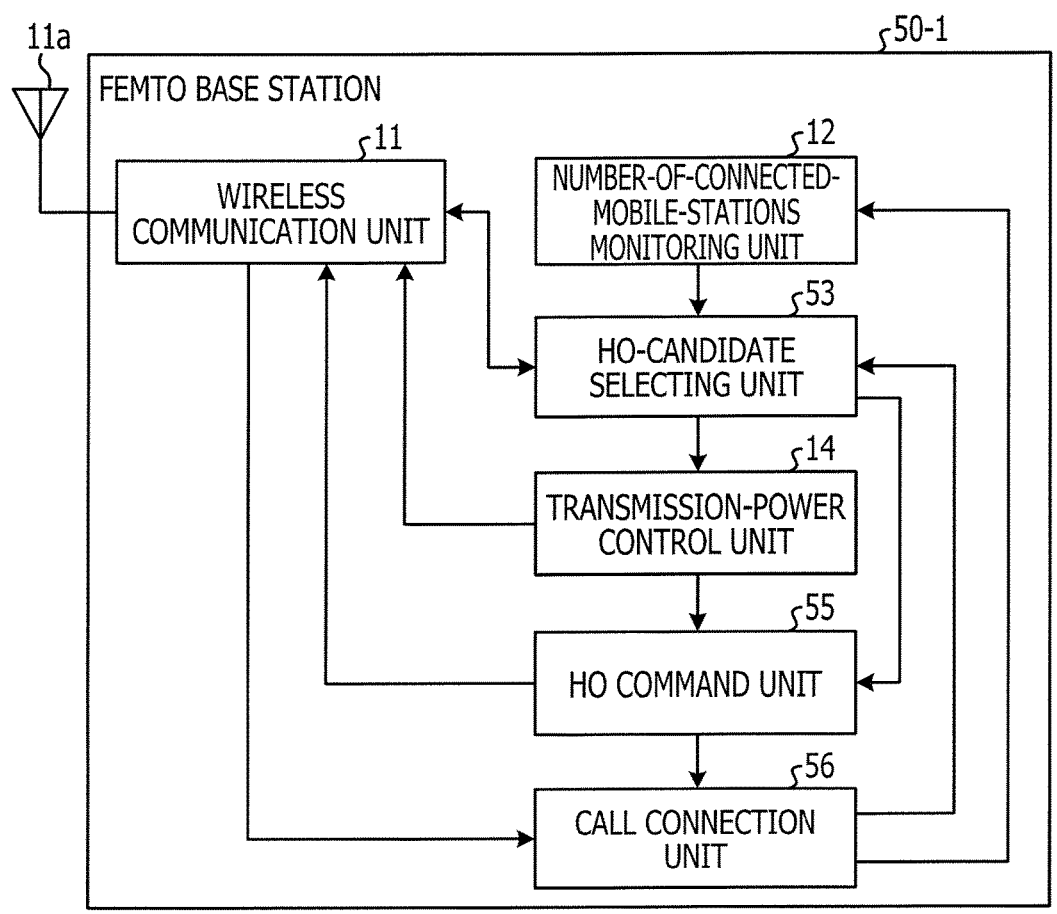
FIG. 18 is a block diagram illustrating the configuration of the femto base station according to the fifth embodiment.

FIG. 18 is a block diagram illustrating the configuration of a femto base station according to the fifth embodiment. In FIG. 18, elements that are the same as or similar to those in FIG. 2 are denoted by the same reference numerals, and descriptions thereof are not given hereinafter. As illustrated in FIG. 18, a femto base station 50-1 according to the present embodiment has an HO-candidate selecting unit 53, an HO command unit 55, and a call connection unit 56, instead of the HO-candidate selecting unit 13, the HO command unit 15, and the call connection unit 16 illustrated in FIG. 2.

When a connection request from an unconnected mobile station is received via the wireless communication unit 11, the call connection unit 56 outputs a notification indicating that the connection request is received to the HO-candidate selecting unit 53, without connecting the unconnected mobile station to the femto cell 1 so that the unconnected mobile station becomes a connected mobile station. The HO command unit 55 receives, from the call connection unit 56, a notification indicating the timing at which an HO process is to be executed. After the HO command unit 55 issues the command for executing the HO process, the call connection unit 56 connects the unconnected mobile station to the femto cell 1 so that the unconnected mobile station becomes a connected mobile station.

The HO-candidate selecting unit 53 receives a monitoring result input from the number-of-connected-mobile-stations monitoring unit 12. The HO-candidate selecting unit 53 receives, from the call connection unit 56, a notification indicating that the connection request was received. Upon receiving, from the call connection unit 56, the notification indicating that the connection request was received, the HO-candidate selecting unit 53 performs the following processing before the call connection unit 56 connects the unconnected mobile station to the femto cell 1 so that the unconnected mobile station becomes a connected mobile station. That is, based on the monitoring result, the HO-candidate selecting unit 53 determines whether or not the number of connected mobile stations, $N_{UE}$, exceeds the threshold $N_{max}$ indicating the number of mobile stations that are connectable to the femto cell 1. It is assumed the threshold $N_{max}$ in the present embodiment has been set to a value that is the upper limit of the number of mobile stations that are connectable to the femto cell 1 and that is the same as the maximum number of connections, M, indicating the upper limit pre-specified as an apparatus specification of the femto base station 50-1. When the number of connected mobile stations, $N_{UE}$, exceeds the threshold $N_{max}$, the HO-candidate selecting unit 53 selects an HO candidate from the connected mobile stations. Details of the HO-candidate selection processing performed by the HO-candidate selecting unit 53 are analogous to the details of the HO-candidate selection processing performed by the HO-candidate selecting unit 13 illustrated in FIG. 2.

The HO command unit 55 receives a selection completion notification and HO-candidate information from the HO-candidate selecting unit 53. The HO command unit 55 instructs the mobile station selected as the HO candidate to execute an HO process. In addition, the HO command unit 55 notifies the call connection unit 56 of the timing at which the HO process is to be executed.

Figure 19A:
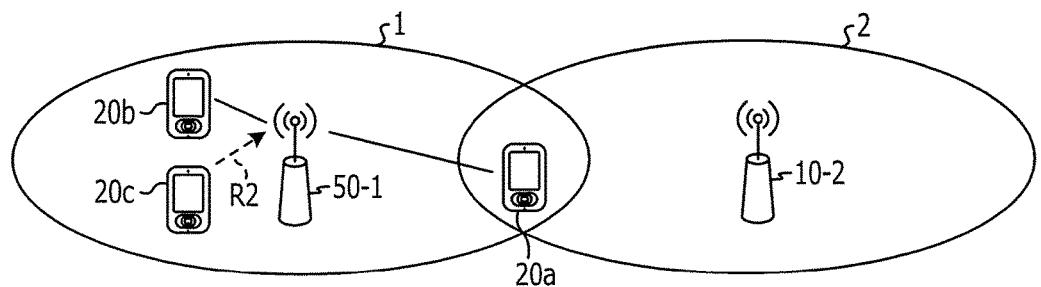
FIGS. 19A to 19C are diagrams illustrating a flow of processing in which the femto base station according to the fifth embodiment makes a mobile station selected as an HO candidate to execute an HO process and then makes an unconnected mobile station to connect to the femto cell.
Figure 19B:
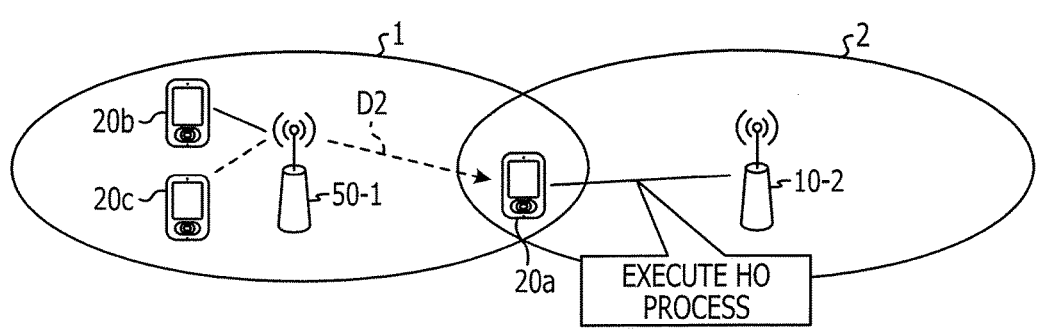
Figure 19C:
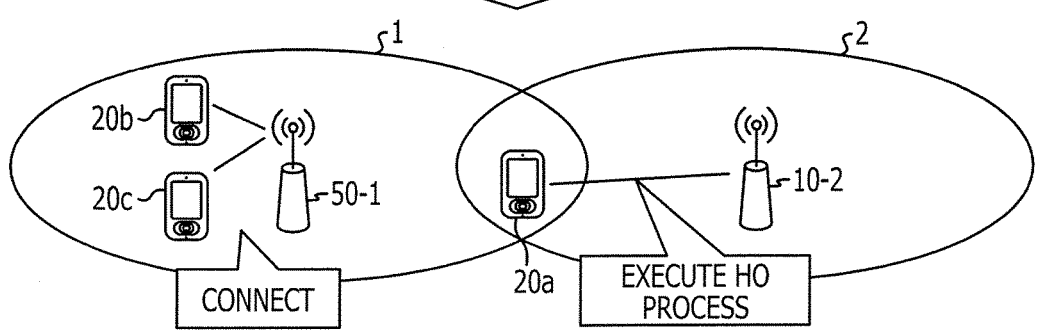

Next, a flow of processing in which the femto base station 50-1 according to the present embodiment makes a mobile station selected as an HO candidate to execute an HO process and then makes an unconnected mobile station to connect to the femto cell 1 will be described with reference to FIGS. 19A to 19C. FIGS. 19A to 19C are diagrams illustrating a flow of processing in which the femto base station according to the fifth embodiment makes a mobile station selected as an HO candidate to execute an HO process and then makes an unconnected mobile station to connect to the femto cell. In the example illustrated in FIGS. 19A to 19C, it is assumed that the threshold $N_{max}$ indicating the number of mobile stations that are connectable to the femto cell 1 is "2" and the threshold $N_{max}$ is set to the same value as the maximum number of connections, M. It is also assumed that mobile stations 20a and 20b are currently connected to the femto cell 1.

The femto base station 50-1 receives a connection request R2 (see FIG. 19A) transmitted from a mobile station 20c, which is an unconnected mobile station that is located in the femto cell 1 but is not connected to the femto cell 1. The femto base station 50-1 then monitors the number of connected mobile stations and determines whether or not the monitored number of connected mobile stations, $N_{UE}$, exceeds the threshold $N_{max}$="2". In FIG. 19A, since the number of connected mobile stations, $N_{UE}$, ="2" has reached the threshold $N_{max}$="2", the femto base station 50-1 selects an HO candidate from the mobile stations 20a and 20b, which are connected mobile stations. In this case, it is assumed that the mobile station 20a located at the cell border between the femto cell 1 and the adjacent cell 2 is selected, as an HO candidate, from the mobile stations 20a and 20b, which are connected mobile stations. The femto base station 50-1 then performs control for reducing the transmission power so that, of transmission signals transmitted from the femto cell 1, signals that arrive at the mobile station 20a selected as the HO candidate decrease.

Subsequently, the femto base station 50-1 transmits, to the mobile station 20a selected as the HO candidate, an command signal D2 for issuing an command for executing an HO process, to thereby cause the mobile station 20a to perform the HO process for switching the connection destination thereof from the femto cell 1 to the adjacent cell 2 (see FIG. 19B).

After issuing the command for executing the HO process to the mobile station 20a, the femto base station 50-1 connects the mobile station 20c, which is an unconnected mobile station, to the femto cell 1 so that the mobile station 20c becomes a connected mobile station (see FIG. 19C).

Figure 20:
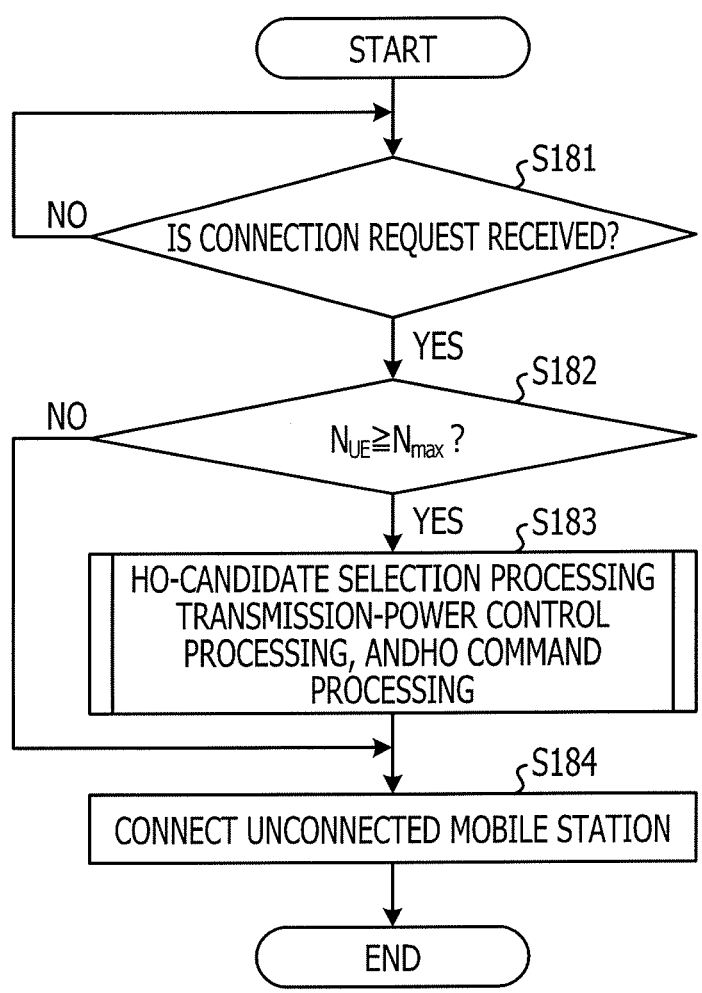
FIG. 20 is a flowchart illustrating a procedure of HO control processing performed by the femto base station according to the fifth embodiment.

Next, a procedure of HO control processing performed by the femto base station 50-1 according to the present embodiment will be described with reference to FIG. 20. FIG. 20 is a flowchart illustrating the procedure of the HO control processing performed by the femto base station 50-1 according to the fifth embodiment.

As illustrated in FIG. 20, if a connection request from an unconnected mobile station is not received (NO in step S181), the call connection unit 56 in the femto base station 50-1 returns the process to step S181. If a connection request from an unconnected mobile station is received (YES in step S181), the call connection unit 56 outputs a notification indicating that the connection request is received to the HO-candidate selecting unit 53, without connecting the unconnected mobile station to the femto cell 1 so that the unconnected mobile station becomes a connected mobile station.

The HO-candidate selecting unit 53 receives the monitoring result input from the number-of-connected-mobile-stations monitoring unit 12. The HO-candidate selecting unit 53 receives, from the call connection unit 56, a notification indicating that the connection request was received. Upon receiving, from the call connection unit 56, the notification indicating that the connection request was received, the HO-candidate selecting unit 53 determines whether or not the number of connected mobile stations, $N_{UE}$, exceeds the threshold $N_{max}$ indicating the number of mobile stations that are connectable to the femto cell 1, based on the monitoring result (step S182). If the number of connected mobile stations, $N_{UE}$, does not exceed the threshold $N_{max}$ (NO in step S182), the HO-candidate selecting unit 53 advances the process to step S184.

On the other hand, if the number of connected mobile stations, $N_{UE}$, exceeds the threshold $N_{max}$ (YES in step S182), the HO-candidate selecting unit 53 advances the process to the HO-candidate selection processing, the transmission-power control processing, and the HO command processing (step S183). The HO-candidate selection processing, the transmission-power control processing, and the HO command processing illustrated in step S183 respectively correspond to the HO-candidate selection processing, the transmission-power control processing, and the HO command processing in step S105 illustrated in FIG. 6.

If step S183 is finished or if the number of connected mobile stations, $N_{UE}$, does not exceed the threshold $N_{max}$ (NO in step S182), the call connection unit 56 connects the unconnected mobile station to the femto cell 1 so that the unconnected mobile station becomes a connected mobile station (step S184).

As described above, the femto base station 50-1 according to the present embodiment determines whether or not the number of connected mobile stations exceeds the threshold $N_{max}$ before an unconnected mobile station that has transmitted a connection request is connected to the femto cell 1. When the number of connected mobile stations exceeds the threshold $N_{max}$, the femto base station 50-1 causes the mobile station selected as the HO candidate to execute an HO process. According to the present embodiment, after the connection destination of an HO candidate selected from connected mobile stations is switched from the femto cell 1 to the adjacent cell 2, an unconnected mobile station can be connected to the femto cell 1.

(Hardware Configuration)

Figure 21:
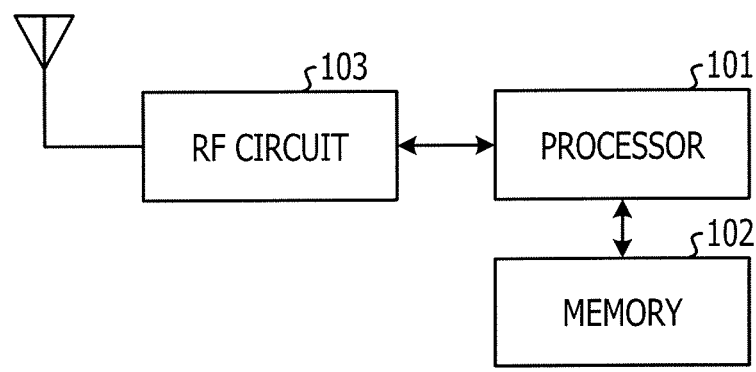
FIG. 21 is a diagram illustrating an example of the hardware configuration of the femto base station.

The femto base station in each embodiment described above may be realized by, for example, a hardware configuration as illustrated in FIG. 21. FIG. 21 is a diagram illustrating an example of the hardware configuration of the femto base station.

As illustrated in FIG. 21, the femto base station has a processor 101, a memory 102, and a radio frequency (RF) circuit 103 as hardware elements. The RF circuit 103 has an antenna. The memory 102 is implemented by, for example, a random access memory (RAM), a read only memory (ROM), or a flash memory. The wireless communication unit 11 is implemented by, for example, an analog circuit, such as the RF circuit 103. The number-of-connected-mobile-stations monitoring unit 12, the HO-candidate selecting unit 13, the transmission-power control unit 14, the HO command unit 15, and the call connection unit 16 are realized by, for example, an integrated circuit, such as the processor 101.

The various types of processing described above in each embodiment can be realized by executing a prepared program with a computer. In this case, programs corresponding to the processing executed by the number-of-connected-mobile-stations monitoring unit 12, the HO-candidate selecting unit 13, the transmission-power control unit 14, the HO command unit 15, and the call connection unit 16 are recorded to the memory 102, and the programs are read out to the processor 101 and function as processes.

By the way, in this application, for example, "connected to" is able to be replaced with "coupled to". Moreover, for example, when an element is referred to as being "connected to" or "coupled to" another element, it can be not only directly but also indirectly connected or coupled to the other element (namely, intervening elements may be present). So do "connecting to", "coupling to", "connection to", "coupling to" and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station configured to serve terminals, the base station comprising:
   a memory; and
   a processor coupled to the memory and configured to:
   obtain measured reception qualities of a downlink signal transmitted from another base station and received via an antenna, the measured reception qualities being measured in the served terminals respectively;
   select a terminal for a handover among the served terminals based on estimated reception qualities of the downlink signal transmitted from the other base station and received via the antenna, when a number of the served terminals exceeds a threshold, the estimated reception qualities of the downlink signal transmitted from the other base station being estimated based on the measured reception qualities under an assumption that the base station is to control to change a transmission parameter for changing a cell coverage of the base station by an amount of change, the amount of change being determined so that an estimated reception quality corresponding to the terminal to be selected is better than a specified value,
   perform the handover of the selected terminal to the other base station, and
   change the transmission parameter by the estimated amount of change; wherein the transmission parameter is at least one of transmission power, beam pattern and directivity of transmission signals.

2. The base station according to claim 1, wherein the processor is configured to select the terminal for the handover whose reception power or reception quality from the base station is the worst among the served terminals whose estimated reception quality is better than the specified value.

3. The base station according to claim 1, wherein the processor is configured to select the terminal for the handover whose reception power or reception quality from the other base station is the best among the served terminals whose estimated reception quality is better than the specified value.

4. The base station according to claim 3, wherein the processor is configured to reselect the terminal for the handover whose reception power or reception quality from the base station is the worst among the served terminals, when the reception power or the reception quality from the other base station is less than a certain value.

5. The base station according to claim 1, wherein the amount of change is determined further so that each of reception powers or each of reception qualities from the base station at each of served terminals other than the terminal to be selected for the handover is not less than a certain value.

6. The base station according to claim 1, wherein the processor is configured to restore the transmission parameter to an original value before the changing, when a certain period elapses after the changing.

7. The base station according to claim 1, wherein the processor is configured to restore the transmission parameter to an original value before the changing, when the number of the served terminals is less than a certain value.

8. The base station according to claim 1, wherein the processor is configured to:
transmit a request, via the antenna, of the handover to the other base station, and
transmit a command of handover to the selected terminal, when a response acknowledging the handover for the request is received.

9. The base station according to claim 1, wherein the processor is configured to judge, when a request for attaching is received from an new terminal that is not served by the base station, whether the number of the served terminals exceeds the threshold or not after a processing for starting to serve the new terminal.

10. The base station according to claim 1, wherein the processor is configured to:
judge, when a request for attaching is received from an new terminal that is not served by the base station, whether the number of the served terminals exceeds the threshold or not before a processing for starting to serve the new terminal, and
perform the processing for starting to serve the new terminal after the handover of the selected terminal.

11. The base station according to claim 1, wherein the transmission parameter is that for changing a cell coverage of the base station.

12. The base station according to claim 1, wherein the processor is configured to select the terminal for the handover so that the amount of change is the lowest from among the served terminals whose estimated reception quality is better than the specified value.

13. A handover control method by a base station configured to serve terminals, the handover control method comprising:

obtaining measured reception qualities of a downlink signal transmitted from another base station and received via an antenna, the measured reception qualities being measured in the served terminals respectively;

selecting a terminal for a handover among the served terminals based on estimated reception qualities of the downlink signal transmitted from the other base station and received via the antenna, when a number of the served terminals exceeds a threshold, the estimated reception qualities of the downlink signal transmitted from the other base station being estimated based on the measured reception qualities under an assumption that the base station is to control to change a transmission parameter for changing a cell coverage of the base station by an amount of change, the amount of change being determined so that an estimated reception quality corresponding to the terminal to be selected is better than a specified value;

performing the handover of the selected terminal to the other base station; and changing the transmission parameter by the estimated amount of change;

wherein the transmission parameter is at least one of transmission power, beam pattern and directivity of transmission signals.

14. The base station according to claim 1, wherein the terminal is selected for the handover before changing the cell coverage of the base station.

\* \* \* \* \*